United States Patent
Khan et al.

(10) Patent No.: US 7,392,368 B2
(45) Date of Patent: Jun. 24, 2008

(54) CROSS MULTIPLY AND ADD INSTRUCTION AND MULTIPLY AND SUBTRACT INSTRUCTION SIMD EXECUTION ON REAL AND IMAGINARY COMPONENTS OF A PLURALITY OF COMPLEX DATA ELEMENTS

(75) Inventors: Moinul H. Khan, Austin, TX (US); Nigel C. Paver, Beaverton, OR (US); Bradley C. Aldrich, Austin, TX (US)

(73) Assignee: Marvell International Ltd., Hamilton (BM)

( * ) Notice: Subject to any disclaimer, the term of this patent is extended or adjusted under 35 U.S.C. 154(b) by 167 days.

(21) Appl. No.: 11/173,408

(22) Filed: Jun. 30, 2005

(65) Prior Publication Data
US 2006/0015702 A1 Jan. 19, 2006

Related U.S. Application Data

(63) Continuation-in-part of application No. 10/262,195, filed on Sep. 30, 2002, now Pat. No. 7,213,128, which is a continuation-in-part of application No. 10/215,756, filed on Aug. 9, 2002, now Pat. No. 6,986,023.

(60) Provisional application No. 60/409,624, filed on Sep. 10, 2002.

(51) Int. Cl.
*G06F 9/302* (2006.01)
(52) U.S. Cl. .......................................... 712/221; 712/22
(58) Field of Classification Search ................... None
See application file for complete search history.

(56) References Cited

U.S. PATENT DOCUMENTS

| 4,750,110 A | 6/1988 | Mothersole et al. |
| 4,873,630 A | 10/1989 | Rusterholz et al. |
| 4,894,768 A | 1/1990 | Iwasaki et al. |
| 5,073,864 A | 12/1991 | Methvin et al. |

(Continued)

FOREIGN PATENT DOCUMENTS

WO WO 97/08608 3/1997

(Continued)

OTHER PUBLICATIONS

AMD Inc., AMD Extensions to the 3DNow!(tm) and MMX(tm) Instruction Sets Manual, Mar. 2000, 22466D/O, AMD Inc., Santa Clara CA USA.

(Continued)

*Primary Examiner*—Kenneth S. Kim

(57) ABSTRACT

Methods and apparatus for calculating Single-Instruction-Multiple-Data (SIMD) complex arithmetic. A coprocessor instruction has a format identifying a multiply and subtract instruction to generate real components for complex multiplication of first operand complex data and corresponding second operand complex data, a cross multiply and add instruction to generate imaginary components for complex multiplication of the first operand complex data and the corresponding second operand complex data, an add-subtract instruction to add real components of the first operand to imaginary components of the second operand and to subtract real components of the second operand from imaginary components of the first operand, and a subtract-add instruction to subtract the real components of the second operand from the imaginary components of the first operand and to add the real components of the first operand to the imaginary components of the second operand.

11 Claims, 29 Drawing Sheets

MULTIPLY SUBTRACT FOR COMPLEX DATA ELEMENTS:

$f_{N/2+1} = x_1 + jX_1$
$f_{N/2} = x_0 + jX_0$ and $W_N^{2k} = w + jW$

| $X_1$ | $x_1$ | $X_0$ | $x_0$ | wRn |
| W | w | W | w | wRm |
| $wx_1 - WX_1$ | | $wx_0 - WX_0$ | | wRd |

CROSS MULTIPLY ADD FOR COMPLEX DATA ELEMENTS:

$f_{N/2+1} = x_1 + jX_1$
$f_{N/2} = x_0 + jX_0$ and $W_N^{2k} = w + jW$

| $X_1$ | $x_1$ | $X_0$ | $x_0$ | wRn |
| W | w | W | w | wRm |
| $Wx_1 + wX_1$ | | $Wx_0 + wX_0$ | | wRd |

U.S. PATENT DOCUMENTS

| | | | |
|---|---|---|---|
| 5,125,095 | A | 6/1992 | Nakazawa et al. |
| 5,420,809 | A | 5/1995 | Read et al. |
| 5,420,989 | A | 5/1995 | Maher et al. |
| 5,696,985 | A | 12/1997 | Crump et al. |
| 5,721,892 | A * | 2/1998 | Peleg et al. ................. 712/221 |
| 5,734,874 | A | 3/1998 | Van Hook et al. |
| 5,802,336 | A | 9/1998 | Peleg et al. |
| 5,805,875 | A | 9/1998 | Asanovic |
| 5,815,715 | A | 9/1998 | Ku. cedilla.uk.cedilla.akar |
| 5,822,619 | A | 10/1998 | Sidwell |
| 5,838,984 | A | 11/1998 | Nguyen et al. |
| 5,893,066 | A | 4/1999 | Hong |
| 5,915,109 | A | 6/1999 | Nakakimura et al. |
| 5,923,893 | A | 7/1999 | Moyer et al. |
| 5,930,519 | A | 7/1999 | Krech |
| 5,933,650 | A | 8/1999 | Van Hook et al. |
| 5,936,872 | A * | 8/1999 | Fischer et al. ............... 708/622 |
| 5,996,057 | A | 11/1999 | Scales et al. |
| 6,006,315 | A | 12/1999 | Park |
| 6,247,113 | B1 | 6/2001 | Jagger |
| 6,282,633 | B1 | 8/2001 | Killian et al. |
| 6,298,438 | B1 | 10/2001 | Thayer et al. |
| 6,332,186 | B1 | 12/2001 | Elwood et al. |
| 6,430,684 | B1 | 8/2002 | Bosshart |
| 6,530,012 | B1 | 3/2003 | Wilson |
| 6,546,480 | B1 | 4/2003 | Mandavilli et al. |
| 6,550,000 | B1 | 4/2003 | Minematsu et al. |
| 6,671,797 | B1 | 12/2003 | Golston |
| 6,748,521 | B1 | 6/2004 | Hoyle |
| 6,754,804 | B1 | 6/2004 | Hudepohl et al. |
| 6,757,820 | B2 | 6/2004 | Sudharsansan et al. |
| 6,829,697 | B1 | 12/2004 | Davis et al. |
| 6,865,663 | B2 | 3/2005 | Barry |
| 7,047,393 | B2 | 5/2006 | Paver et al. |
| 7,228,401 | B2 | 6/2007 | Moyer |
| 2002/0004809 | A1 * | 1/2002 | Golliver et al. ............. 708/622 |
| 2002/0065860 | A1 | 5/2002 | Grisenthwaite et al. |
| 2002/0083311 | A1 | 6/2002 | Paver |
| 2003/0120903 | A1 | 6/2003 | Roussel |
| 2003/0204819 | A1 | 10/2003 | Matsumoto et al. |
| 2003/0221089 | A1 | 11/2003 | Spracklen |
| 2004/0073773 | A1 * | 4/2004 | Demjanenko ................. 712/7 |
| 2005/0097299 | A1 * | 5/2005 | Dockser ....................... 712/2 |

FOREIGN PATENT DOCUMENTS

WO    WO 00/43868    7/2000

OTHER PUBLICATIONS

ARM Ltd., ARM Instruction Set Quick Reference Card, Oct. 1999, ARM QRC 0001D, ARM Ltd., Cambridge UK.

Brash, D., The ARM ARchitecture Version 6 (ARMv6), Jan. 2002, ARM White Paper, ARM Ltd., Cambridge UK.

Lewis, A., MPEG-4 Over Wireless Networks, 2000. ARM White Paper, ARM Ltd., Cambridge UK.

Wragg, B. & Carpenter, P., An Optimised Software Solution for an ARM Powered (tm) MP3 Decoder, Oct. 2000, ARM White Papaer, ARM Ltd., Cambridge Uk.

Garner, R.B. et al. "The Scalable Processor Architecture (SPARC)." *Intellectual Leverage, San Francisco, Feb. 29-Mar. 4, 1988. Computer Society International Conference Washington*, IEEE Comp. Soc. Press, US vol. Conf. 33, Feb. 29, 1988, pp. 278-283.

Ikei, Mitsuru. "Basic of IA-64 Processor." Published from Ohmsha Corporation on Aug. 25, 2000., pp. 150, 160 and 161, in Japanese.

Derby, J. and Moreno, J., A Hig-Performance Embedded DSP Core with Novel SIMD Features, ICASSP, IEEE 0-7803-7663-3, 2003.

Lerner, Boris, Parallel Implementation of Fixed-Point FFTs on TigerSHARC(R) Processors, Analog Devices, EE-263, rev 1, Feb. 3, 2005.

* cited by examiner

FIG. 4

| 31-28 | 27-24 | 23,22 | 21,20 | 19-16 | 15-12 | 11-8 | 7-5 | 4 | 3-0 |
|---|---|---|---|---|---|---|---|---|---|
| 410 | 411 | 412 | 413 | 414 | 415 | 416 | 417 | 418 | 419 |

| 31-28 | 27-24 | 23-21 | 20 | 19-16 | 15-12 | 11-8 | 7-5 | 4 | 3-0 |
|---|---|---|---|---|---|---|---|---|---|
| 510 | 511 | 512 | 513 | 514 | 515 | 516 | 517 | 518 | 519 |

| 31-28 | 27-24 | 23-20 | 19-16 | 15-12 | 11-8 | 7-4 | 3-0 |
|---|---|---|---|---|---|---|---|
| 610 | 611 | 612 | 613 | 614 | 615 | 616 | 617 |

NZCV 620

601

602

| 31-27 | 26-8 | 7-5 | 4-0 |
|---|---|---|---|
| NZCVQ | 631 | 632 | 633 |

| 31-8 | 7 | 6 | 5 | 4 | 3 | 2 | 1 | 0 |
|---|---|---|---|---|---|---|---|---|
| 718 | 717 | 716 | 715 | 714 | 713 | 712 | 711 | 710 |

701

MULTIPLY SUBTRACT FOR COMPLEX DATA ELEMENTS:

$f_{N/2+1} = x_1 + jX_1$
$f_{N/2} = x_0 + jX_0$ and $W_N^{2k} = w + jW$

| $X_1$ | $x_1$ | $X_0$ | $x_0$ | wRn |
|---|---|---|---|---|
| W | w | W | w | wRm |
| $wx_1 - WX_1$ | | $wx_0 - WX_0$ | | wRd |

FIG. 20a

CROSS MULTIPLY ADD FOR COMPLEX DATA ELEMENTS:

$f_{N/2+1} = x_1 + jX_1$
$f_{N/2} = x_0 + jX_0$ and $W_N^{2k} = w + jW$

| $X_1$ | $x_1$ | $X_0$ | $x_0$ | wRn |
|---|---|---|---|---|
| W | w | W | w | wRm |
| $Wx_1 + wX_1$ | | $Wx_0 + wX_0$ | | wRd |

FIG. 20b

ADDITION FOR COMPLEX DATA ELEMENTS:

$f_{N/2+1} W_N^{2k} = u_1 + jU_1 \qquad f_1 W_N^0 = s_1 + jS_1$ $f_{N/2} W_N^{2k} = u_0 + jU_0 \quad \text{and} \quad f_0 W_N^0 = s_0 + jS_0$

| $S_1$ | $s_1$ | $S_0$ | $s_0$ | wRn |
|---|---|---|---|---|
| $U_1$ | $u_1$ | $U_0$ | $u_0$ | wRm |
| $S_1+U_1$ | $s_1+u_1$ | $S_0+U_0$ | $s_0+u_0$ | wRd |

FIG. 22a

ADDITION FOR COMPLEX DATA ELEMENTS:

$f_{3N/4+1} W_N^{3k} = v_1 + jV_1 \qquad f_{N/4+1} W_N^k = t_1 + jT_1$ $f_{3N/4} W_N^{3k} = v_0 + jV_0 \quad \text{and} \quad f_{N/4} W_N^k = t_0 + jT_0$

| $T_1$ | $t_1$ | $T_0$ | $t_0$ | wRn |
|---|---|---|---|---|
| $V_1$ | $v_1$ | $V_0$ | $v_0$ | wRm |
| $T_1+V_1$ | $t_1+v_1$ | $T_0+V_0$ | $t_0+v_0$ | wRd |

FIG. 22b

SUBTRACTION FOR COMPLEX DATA ELEMENTS:

$$f_{N/2+1} W_N^{2k} = u_1 + jU_1 \qquad f_1 W_N^0 = s_1 + jS_1$$

$$f_{N/2} W_N^{2k} = u_0 + jU_0 \quad \text{and} \quad f_0 W_N^0 = s_0 + jS_0$$

| $S_1$ | $s_1$ | $S_0$ | $s_0$ | wRn |
|---|---|---|---|---|
| $U_1$ | $u_1$ | $U_0$ | $u_0$ | wRm |
| $S_1-U_1$ | $s_1-u_1$ | $S_0-U_0$ | $s_0-u_0$ | wRd |

FIG. 22c

SUBTRACTION FOR COMPLEX DATA ELEMENTS:

$$f_{3N/4+1} W_N^{3k} = v_1 + jV_1 \qquad f_{N/4+1} W_N^k = t_1 + jT_1$$

$$f_{3N/4} W_N^{3k} = v_0 + jV_0 \quad \text{and} \quad f_{N/4} W_N^k = t_0 + jT_0$$

| $T_1$ | $t_1$ | $T_0$ | $t_0$ | wRn |
|---|---|---|---|---|
| $V_1$ | $v_1$ | $V_0$ | $v_0$ | wRm |
| $T_1-V_1$ | $t_1-v_1$ | $T_0-V_0$ | $t_0-v_0$ | wRd |

FIG. 22d

ADDITION FOR COMPLEX DATA ELEMENTS:

$f_1 W_N^0 + f_{N/2+1} W_N^{2k}$     $f_{N/4+1} W_N^k + f_{3N/4+1} W_N^{3k}$ $f_0 W_N^0 + f_{N/2} W_N^{2k}$ and $f_{N/4} W_N^k + f_{3N/4} W_N^{3k}$

| $S_1+U_1$ | $s_1+u_1$ | $S_0+U_0$ | $s_0+u_0$ | wRn |
|---|---|---|---|---|
| $T_1+V_1$ | $t_1+v_1$ | $T_0+V_0$ | $t_0+v_0$ | wRm |
| $S_1+T_1+U_1+V_1$ | $s_1+t_1+u_1+v_1$ | $S_0+T_0+U_0+V_0$ | $s_0+t_0+u_0+v_0$ | wRd |

FIG. 22e

SUBTRACTION FOR COMPLEX DATA ELEMENTS:

$f_1 W_N^0 + f_{N/2+1} W_N^{2k}$     $f_{N/4+1} W_N^k + f_{3N/4+1} W_N^{3k}$ $f_0 W_N^0 + f_{N/2} W_N^{2k}$ and $f_{N/4} W_N^k + f_{3N/4} W_N^{3k}$

| $S_1+U_1$ | $s_1+u_1$ | $S_0+U_0$ | $s_0+u_0$ | wRn |
|---|---|---|---|---|
| $T_1+V_1$ | $t_1+v_1$ | $T_0+V_0$ | $t_0+v_0$ | wRm |
| $S_1-T_1+U_1-V_1$ | $s_1-t_1+u_1-v_1$ | $S_0-T_0+U_0-V_0$ | $s_0-t_0+u_0-v_0$ | wRd |

FIG. 22f

ADD-SUBTRACT FOR COMPLEX DATA ELEMENTS:

$f_1 W_N^0 - f_{N/2+1} W_N^{2k}$  $\quad$  $f_{N/4+1} W_N^k - f_{3N/4+1} W_N^{3k}$ $f_0 W_N^0 - f_{N/2} W_N^{2k}$ $\quad$ and $\quad$ $f_{N/4} W_N^k - f_{3N/4} W_N^{3k}$

| $S_1-U_1$ | $s_1-u_1$ | $S_0-U_0$ | $s_0-u_0$ | wRn |
|---|---|---|---|---|
| $T_1-V_1$ | $t_1-v_1$ | $T_0-V_0$ | $t_0-v_0$ | wRm |
| $S_1-t_1-U_1+v_1$ | $s_1+T_1-u_1-V_1$ | $S_0-t_0-U_0+v_0$ | $s_0+T_0-u_0-V_0$ | wRd |

FIG. 22g

SUBTRACT-ADD FOR COMPLEX DATA ELEMENTS:

$f_1 W_N^0 - f_{N/2+1} W_N^{2k}$  $\quad$  $f_{N/4+1} W_N^k - f_{3N/4+1} W_N^{3k}$ $f_0 W_N^0 - f_{N/2} W_N^{2k}$ $\quad$ and $\quad$ $f_{N/4} W_N^k - f_{3N/4} W_N^{3k}$

| $S_1-U_1$ | $s_1-u_1$ | $S_0-U_0$ | $s_0-u_0$ | wRn |
|---|---|---|---|---|
| $T_1-V_1$ | $t_1-v_1$ | $T_0-V_0$ | $t_0-v_0$ | wRm |
| $S_1+t_1-U_1-v_1$ | $s_1-T_1-u_1+V_1$ | $S_0+t_0-U_0-v_0$ | $s_0-T_0-u_0+V_0$ | wRd |

FIG. 22h

CROSS MULTIPLY AND ADD INSTRUCTION AND MULTIPLY AND SUBTRACT INSTRUCTION SIMD EXECUTION ON REAL AND IMAGINARY COMPONENTS OF A PLURALITY OF COMPLEX DATA ELEMENTS

RELATED APPLICATIONS

This is a continuation-in-part of application Ser. No. 10/262,195, filed Sep. 30, 2002, now U.S. Pat. No. 7,213,128, which is a continuation-in-part of application Ser. No. 10/215,756, filed Aug. 9, 2002, now U.S. Pat. No. 6,986,023, which also claims the benefit of provisional U.S. application Ser. No. 60/409,624, filed Sep. 10, 2002.

FIELD OF THE DISCLOSURE

This disclosure relates generally to the field of processors. In particular, the disclosure relates to Single-Instruction-Multiple-Data (SIMD) operations which support complex arithmetic.

BACKGROUND OF THE DISCLOSURE

It is known to provide data processing systems incorporating both main processors and a coprocessor. In some systems it is known to be able to provide one or more different coprocessors with a main processor. In this case, the different coprocessors can be distinguished by different coprocessor numbers.

A coprocessor instruction encountered in the instruction data stream of the main processor is issued on a bus coupled to the coprocessor. The one or more coprocessors (that each have an associated hardwired coprocessor number) attached to the bus examine the coprocessor number field of the instruction to determine whether or not they are the target coprocessor for that instruction. If they are the target coprocessor, then they issue an accept signal to the main processor. If the main processor does not receive an accept signal, then it can enter an exception state to deal with the undefined instruction.

One type of instruction may perform operations on packed data. Such instructions may be referred to as Single-Instruction-Multiple-Data (SIMD) instructions. One set of SIMD instructions was defined for the Pentium® Processor with MMX™ Technology by Intel® Corporation and described in "IA-32 Intel Architecture Software Developer's Manual Volume 2: Instruction Set Reference," which is available online from Intel Corporation, Santa Clara, Calif. at www.intel.com/design/litcentr.

Currently, the SIMD addition or subtraction operation only performs addition or subtraction, where pairs of data elements, for example, a first element Xn (where n is an integer) from one operand, and a second element Yn from a second operand, are added together or subtracted. For example, such an addition operation may be performed on sets of data elements $(X_3, X_2, X_1$ and $X_0)$ and $(Y_3, Y_2, Y_1,$ and $Y_0)$ accessed as Source1 and Source2, respectively to obtain the result $(X_3+Y_3, X_2+Y_2, X_1+Y_1,$ and $X_0+Y_0)$.

Although many applications currently in use can take advantage of such an operation, there are a number of important applications which would require the rearrangement of the data elements before the above addition operation can be implemented so as to provide realization of the application.

For example, a complex radix-4 decimation in time operation of a Fast-Fourier Transform (FFT) is shown in FIG. 19a. The computations at each stage are called butterflies. In general, a radix-4 butterfly involves 3 complex multiplications and 12 complex additions.

The complex radix-4 butterfly is equivalent to the matrix operations shown in FIG. 19b. Product 1950 represents the multiplication of the complex inputs by the complex twiddle factors as seen on the left hand side of the radix-4 butterfly illustrated in FIG. 19a. Transformation matrix 1920 selectively reorders and negates the complex product components to produce the output vector 1910 for a particular butterfly stage.

Selective reordering and negation of complex SIMD components represents a significant computational overhead in complex multiplications and transformations such as those performed in the radix-4 FFT butterfly.

Accordingly, there is a need in the technology for providing an apparatus and method which more efficiently performs complex multiplication and butterfly computations, such as those used in FFTs for example, without requiring additional time to perform operations that negate, shuffle and recombine data elements. There is also a need in the technology for a method and operation for increasing code density by eliminating the necessity for the rearrangement of data elements and thereby eliminating the corresponding rearrangement operations from the code. By eliminating the necessity for the rearrangement and selective negation of data elements, additional registers could also be made available that might otherwise have been used to store patterns for shuffling and/or negating data elements.

BRIEF DESCRIPTION OF THE DRAWINGS

The present invention is illustrated by way of example and not limitation in the figures of the accompanying drawings.

FIG. 4 is a depiction of an operation encoding (opcode) format for a coprocessor instruction.

FIG. 5 is a depiction of an alternative operation encoding (opcode) format for a coprocessor instruction.

FIG. 6 is a depiction of two alternative registers for storing arithmetic status flags.

FIG. 7 illustrates one embodiment of a register for storing SIMD saturation history.

FIG. 20a illustrates one embodiment of a process to perform a SIMD multiply and subtract operation to generate real components for a complex multiplication.

FIG. 20b illustrates one embodiment of a process to perform a SIMD cross multiply and add operation to generate imaginary components for a complex multiplication.

FIG. 22a-h illustrate embodiments of processes to perform SIMD addition subtraction, add-subtract and subtract-add operations to transform product components for a radix-4 Fast-Fourier Transform (FFT).

DETAILED DESCRIPTION

Figure 1:
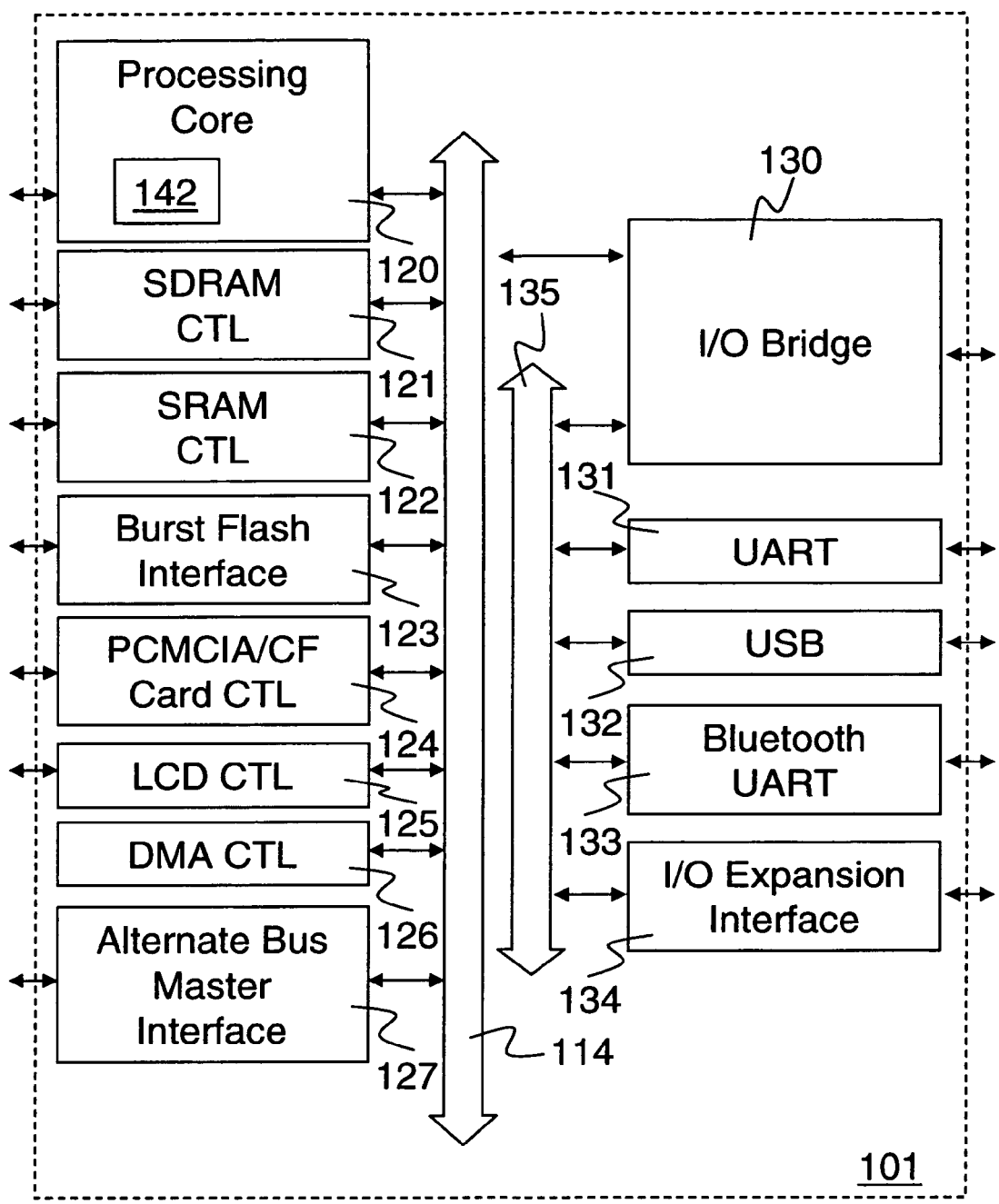
FIG. 1 illustrates one embodiment of a data processing system capable of SIMD complex arithmetic.

Disclosed herein are processes and apparatus for calculating Single-Instruction-Multiple-Data (SIMD) complex arithmetic. A coprocessor instruction has a format identifying a multiply and subtract instruction to generate real components for complex multiplication of first operand complex data and corresponding second operand complex data, a cross multiply and add instruction to generate imaginary components for complex multiplication of the first operand complex data and the corresponding second operand complex data, an add-subtract instruction to add real components of the first operand to imaginary components of the second operand and to subtract real components of the second operand from imaginary components of the first operand, and a subtract-add instruction to subtract the real components of the second operand from the imaginary components of the first operand and to add the real components of the first operand to the imaginary components of the second operand.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

For the purpose of the following discussion of embodiments of the present invention, illustrative terms are used. Definitions for certain such illustrative terms follows.

A data processing device or system may be understood to mean any one of a variety of devices or systems for accessing data and/or communications. Examples include but are not limited to any combinations of one or more of the following: laptop computers, notebook computers; desktop computers, personal digital assistants, handheld computers, personal organizers; palmtop computers, pocket computers, cellular telephone/fax devices, game computers, digitizing tablet devices, electronic books, or digital audio recorder/players.

A register is any device capable of storing and providing data. Further functionality of a register with respect to data formats is described below. A register is not necessarily, included on the same die or in the same package as the processor.

A wireless device or interface may be understood to mean any one of a variety of devices or interfaces for wireless communications. Examples include but are not limited to any combination of devices for one or more of the following: short-range radio, satellite communications, wireless local area networks, wireless telephony, cellular digital packet data, home radio frequency, narrowband time-division multiple access, code-division multiple access, wideband code-division multiple access, wireless fidelity or short message service.

It will be appreciated that the invention may be modified in arrangement and detail by those skilled in the art without departing from the principles of the present invention within the scope of the accompanying claims and their equivalents.

Turning now to FIG. 1, one embodiment of a data processing system 101 capable of storing SIMD saturation history is illustrated. One embodiment of data processing system 101 is an Intel® Personal Internet Client Architecture (Intel® PCA) applications processors with Intel XScale™ technology (as described on the world-wide web at developer.intel.com). It will be readily appreciated by one of skill in the art that the embodiments described herein can be used with alternative processing systems without departure from the scope of the invention.

Data processing system 101 comprises a processing core 120 capable of performing SIMD operations and storing SIMD saturation history. For one embodiment of processing core 120, a register file 142 provides storage locations for storing SIMD saturation history. Processing core 120 is coupled with bus 114 for communicating with various other system devices, which may include but are not limited to, for example, synchronous dynamic random access memory (SDRAM) control 121, static random access memory (SRAM) control, burst flash memory interface 123, personal computer memory card international association (PCMCIA)/compact flash (CF) card control 124, liquid crystal display (LCD) control 125, direct memory access (DMA) controller 126, and alternative bus master interface 127.

In one embodiment, data processing system 101 may also comprise an I/O bridge 130 for communicating with various I/O devices via an I/O bus 135. Such I/O devices may include but are not limited to, for example, universal asynchronous receiver/transmitter (UART) 131, universal serial bus (USB) 132, Bluetooth wireless UART 133 and I/O expansion interface 134.

One embodiment of data processing system 101 provides for mobile, network and/or wireless communications and a processing core 120 capable of performing SIMD operations and storing SIMD saturation history. Processing core 120 may be programmed with various audio, video, imaging and communications algorithms. It will be appreciated that these algorithms may include digital signal processing (DSP) building blocks, which may benefit from SIMD operations, such as: convolutions; auto-correlation functions (ACF) or cross-correlation functions (CCF); digital filters such as finite impulse response filters (FIR), adaptive filters (AF) which include, for example, least mean squared (LMS) error algorithms for echo cancellation, or infinite impulse response filters (IIR); discrete transformations such as a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

It will also be appreciated that such DSP building block algorithms may be designed to process fixed-point data in a SIMD fashion. Since fixed-point data has a more limited dynamic range than floating-point data, such algorithms may make use of saturation to avoid worst case wrap-around effects. For some applications, trade-offs may be made between higher quality results for average case data and worst case wrap-around results. In applications such as these and in other applications, detection of saturation history may provide for greater flexibility, for example, providing higher quality for the average case and detecting saturation to make adjustments in the algorithm for the worst case.

Figure 2:
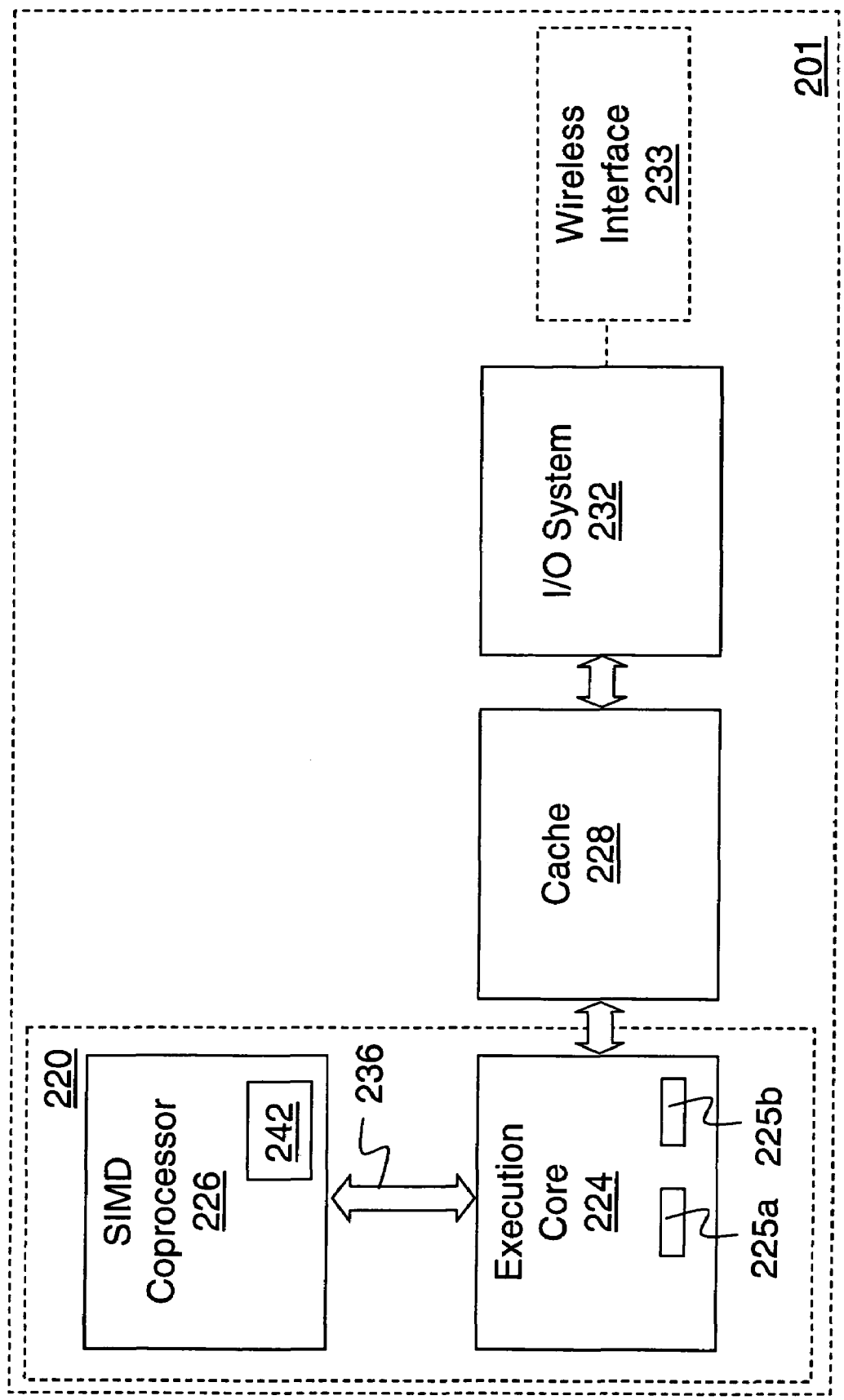
FIG. 2 illustrates alternative embodiments of a data processing system capable of SIMD complex arithmetic.

FIG. 2 illustrates alternative embodiments of a data processing system capable of storing SIMD saturation history. In accordance with one alternative embodiment, data processing system 201 may include a main processor 224, a multimedia coprocessor 226, a cache memory 228 and an input/output system 232. The input/output system 232 may optionally be coupled to a wireless interface 233. Multimedia coprocessor 226 is capable of performing SIMD operations and storing SIMD saturation history. For one embodiment of multimedia coprocessor 226, a register file 242 provides storage locations for storing SIMD saturation history.

In operation, the main processor 224 executes a stream of data processing instructions that control data processing operations of a general type including interactions with the cache memory 228, and the input/output system 232. Embedded within the stream of data processing instructions are coprocessor instructions. The main processor 224 recognizes these coprocessor instructions as being of a type that should be executed by an attached coprocessor 226. Accordingly, the main processor 224 issues these coprocessor instructions on the coprocessor bus 236 from where they are received by any attached coprocessors. In this case, the coprocessor 226 will accept and execute any received coprocessor instructions that it detects are intended for it. This detection is via the combination of a coprocessor number field and valid instruction encoding for the designated coprocessor, within the coprocessor instruction.

Data may be received via wireless interface 233 for processing by the coprocessor instructions. For one example, voice communication may be received in the form of a digital signal, which may be processed by the coprocessor instructions to regenerate digital audio samples representative of the voice communications. For another example, compressed audio and/or video may be received in the form of a digital bit stream, which may be processed by the coprocessor instructions to regenerate digital audio samples and/or motion video frames.

In accordance with another alternative embodiment, data processing system 201 may include a processing core 220, a cache memory 228 and an input/output system 232. The input/output system 232 may optionally be coupled to a wireless interface 233. Processing core 220 is capable of performing SIMD operations and storing SIMD saturation history. For one embodiment of processing core 220, an execution core 224 and a SIMD coprocessor are integrated into a single processing core 220 comprising a register file 242 to provide storage locations for storing SIMD saturation history.

For one embodiment of processing core 220, instructions can be conditionally executed. Conditionally executed includes instructions that have an associated condition that is checked by determining if flags 225a and 225b match the condition associated with the instruction.

Figure 3:
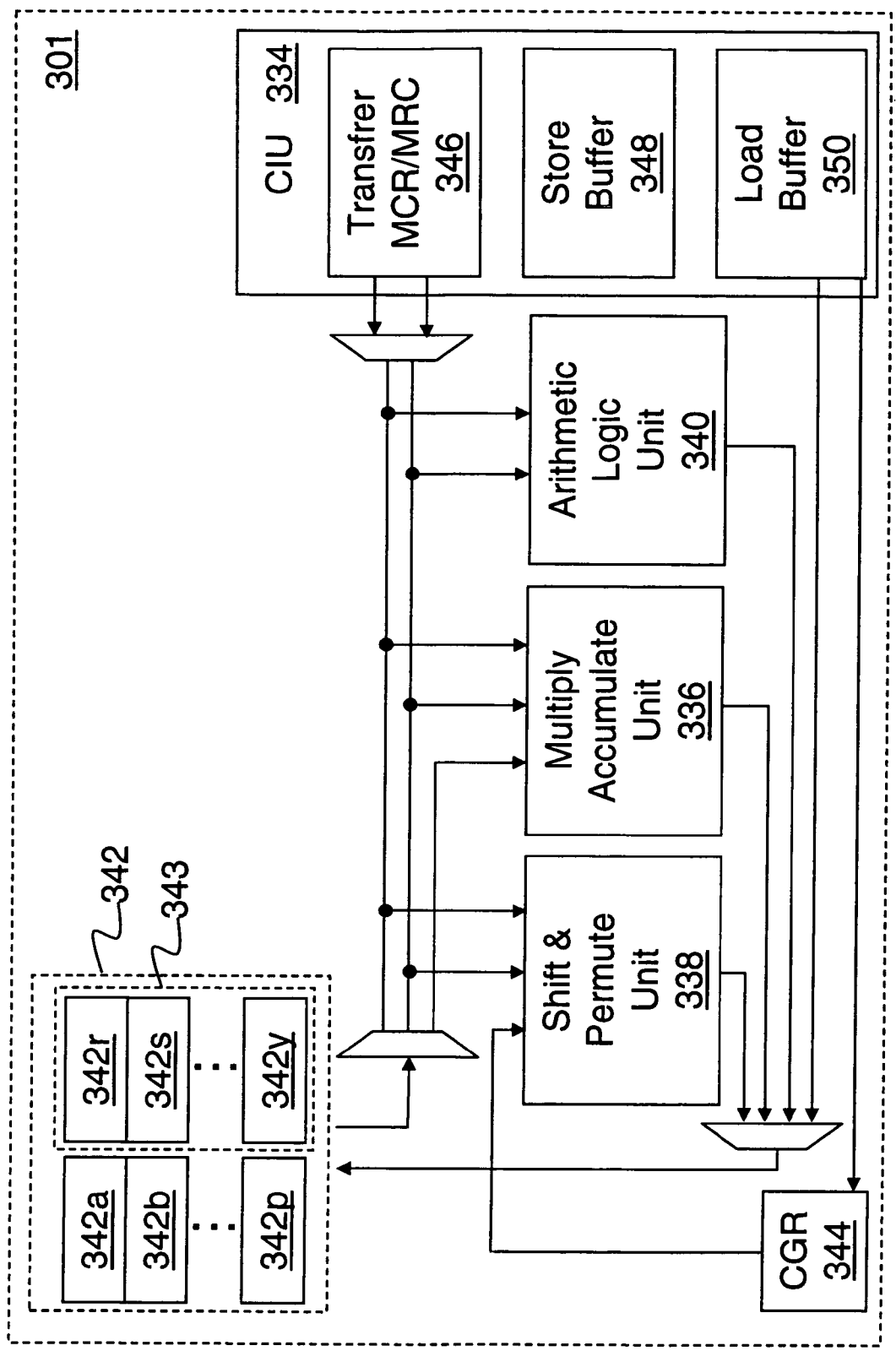
FIG. 3 illustrates one embodiment of a coprocessor capable of SIMD complex arithmetic.

Referring to FIG. 3, one embodiment of a multimedia coprocessor 301 may include a coprocessor interface unit (CIU) 334 including a transfer buffer 346. The transfer buffer 346 may facilitate transfers to a coprocessor register (MCR) and transfers from a coprocessor (MRC). In one embodiment, as shown, the CIU 334 may detect and/or identify coprocessor instructions intended for multimedia coprocessor 301. The CIU 334 may also include a store buffer 348 and a load buffer 350. The CIU 334 communicates with a multiply accumulate unit 336, a shift and permute unit 338, and an arithmetic logic unit (ALU) 340. The CGR 344 contains auxiliary registers. A plurality of multiplexers (MUX) facilitate the data transfer between various units.

Register file (RF) unit 342 may include a plurality of registers. One embodiment of RF unit 342 includes sixteen data registers 342a-342p and eight status and control registers 342r-342y. For one alternative embodiment of RF unit 342, the data registers comprise 64 bits of data and the status and control registers comprise 32 bits of data. For another alternative embodiment of RF unit 342, the data registers comprise 128 bits of data to provide for wider SIMD operations and the status and/or control registers comprise 64 or more bits of data.

In one embodiment of coprocessor 301 instructions, up to three registers may be assigned. For one embodiment of coprocessor 301, up to two source registers and one destination register may be assigned to an instruction. For an alternative embodiment of coprocessor 301, one or more source registers and/or a destination register may be implicit to an instruction. A primary source register may be designated wRn, a secondary source register may be designated wRm, and a destination register may be designated wRd in accordance with one embodiment of coprocessor 301.

Turning next to FIG. 4, in some alternative embodiments, 64 bit single instruction multiple data (SIMD) arithmetic operations may be performed through a coprocessor data processing (CDP) instruction. Operation encoding (opcode) format 401 depicts one such CDP instruction having CDP opcode fields 411 and 418. The type of CDP instruction, for alternative embodiments of SIMD arithmetic operations, may be encoded by one or more of fields 412, 413, 416 and 417. Three operands per instruction may be used, including up to two source 414 and 419 operands and one destination 415 operand. The coprocessor can operate on 8, 16, 32, and 64 bit values and instructions may be executed conditionally, in some embodiments, using condition field 410. For some instructions source data sizes may be encoded by field 412.

In some cases, multiplication, addition and subtraction can be performed, as well as addition with carry. Zero (Z), negative (N), carry (C), and overflow (V) detection can be done on SIMD fields. Also, signed saturation or unsigned saturation to the SIMD field width can be performed for some operations. For instructions in which saturation is enabled, saturation detection can be done on SIMD fields. For some instructions, the type of saturation may be encoded by field 413. For other instructions, the type of saturation may be fixed.

FIG. 5 is a depiction of an alternative operation encoding (opcode) format 501 for a coprocessor instruction. Opcode format 501 depicts a move from coprocessor (MRC) instruction or a move to coprocessor (MCR) instruction having MRC and MCR opcode fields 511, 513 and 518. The type of MRC or MCR instruction may be encoded by one or more of fields 512, 513, 516 and 517, field 513 distinguishing between an MRC or an MCR instruction. Up to three operands per instruction may be used, including up to two source 514 and 519 operands and one destination 515 operand. In alternative embodiments, the coprocessor can transfer 1-8, 16, 32, and/or 64 bit values. For some instructions source data sizes may be encoded by field 512. For other instructions source data sizes may be encoded by field 517. For some instructions source field 512 may encode what type of arithmetic or saturation flags to transfer and/or combine. Instructions may also be executed conditionally, in some embodiments, using condition field 510.

One alternative operation encoding (opcode) format corresponds with the general integer opcode format, having twenty-four, thirty-two or more bits, described in the "IA-32 Intel Architecture Software Developer's Manual Volume 2: Instruction Set Reference," which is available online from Intel Corporation, Santa Clara, Calif. at www.intel.com/design/litcentr. It will be appreciated that one or more of fields 412, 413, 416 and 417 may all be combined into one large opcode field comprising bits six through twenty-three or bits six through thirty-one of this format. For some instructions, bits three through five are to identify a first source operand address. In one embodiment, where there is a first source operand address, then bits three through five also correspond to the destination operand address. Bits zero through two may identify a second source operand address. In an alternate embodiment, where bits zero through two identify a second source operand address, then bits zero through two also correspond to the destination operand address. For other instructions, bits three through five represent an extension to the opcode field. In one embodiment, this extension allows a programmer to include an immediate value with the control signal, such as a shift count value. In one embodiment, the immediate value follows the control signal. This general format allows register to register, memory to register, register by memory, register by register, register by immediate, register to memory addressing. Also, in one embodiment, this general format can support integer register to register, and register to integer register addressing.

FIG. 6 is a depiction of two alternative registers, wireless coprocessor arithmetic status flags (wCASF) register 601 and current program status register (CPSR) 602 for storing arithmetic status flags. One embodiment of wCASF register 601 comprises, SIMD fields 610-617, each storing a set 620 of arithmetic flags to indicate negative (N) zero (Z) carry out (C) and overflow (V). For one alternative embodiment of wCASF register 601, each of SIMD fields 610-617 includes a flag to indicate saturation history. CPSR 602 comprises mode field 633, control field 632, reserved field 631 and condition code flags set 630. Condition code flags set 630 indicate negative (N) zero (Z) carry out (C) overflow (V) and optionally saturation (Q).

FIG. 7 illustrates one embodiment of a wireless coprocessor saturation status flags (wCSSF) register 701 for storing SIMD saturation history. One embodiment of wCSSF register 701 comprises reserved field 718 and SIMD fields 710-717, each storing saturation history according to whether saturation has occurred at a particular byte, half word or word position. For one alternative embodiment of wCSSF register 701, reserved field 718 comprises SIMD fields for storing saturation history of packed data in a most significant double word.

For one embodiment of wCSSF register 701, saturation history stored in SIMD fields 710-717 is sticky. That is to say SIMD fields 710-717 remain set until explicitly cleared, for example, by reset or by writing to the wCSSF register 701. For one alternative embodiment of wCSSF register 701, saturation history stored in SIMD fields 710-717 is not sticky and zero is written to SIMD fields 710-717 according to whether saturation has not occurred in an operation at a particular byte, half word or word position. For another alternative embodiment of wCSSF register 701, reserved field 718 comprises SIMD fields for storing saturation history of packed data that is not sticky. For one alternative embodiment of wCSSF register 701, saturation history stored in lower unused SIMD fields 710-717 is not cleared to zero for 16- or 32-bit SIMD operations when saturation occurs at a particular half word or word position.

For one embodiment of wCSSF register 701: saturation history stored in SIMD field 717 indicates saturation for byte 7, half word 3, word 1, or double word 0; saturation history stored in SIMD field 716 indicates saturation for byte 6; saturation history stored in SIMD field 715 indicates saturation for byte 5 or half word 2; saturation history stored in SIMD field 714 indicates saturation for byte 4; saturation history stored in SIMD field 713 indicates saturation for byte 3, half word 1 or word 0; saturation history stored in SIMD field 712 indicates saturation for byte 2; saturation history stored in SIMD field 711 indicates saturation for byte 1 or half word 0; and saturation history stored in SIMD field 710 indicates saturation for byte 0.

It will be appreciated that algorithms designed to process fixed-point data in a SIMD fashion, may make use of saturation to avoid worst case wrap-around effects. Detection of saturation history may provide for greater design flexibility, for example, providing higher quality for the average case and detecting saturation to make computational adjustments such as rescaling of coefficients for the worst case.

Figure 8:
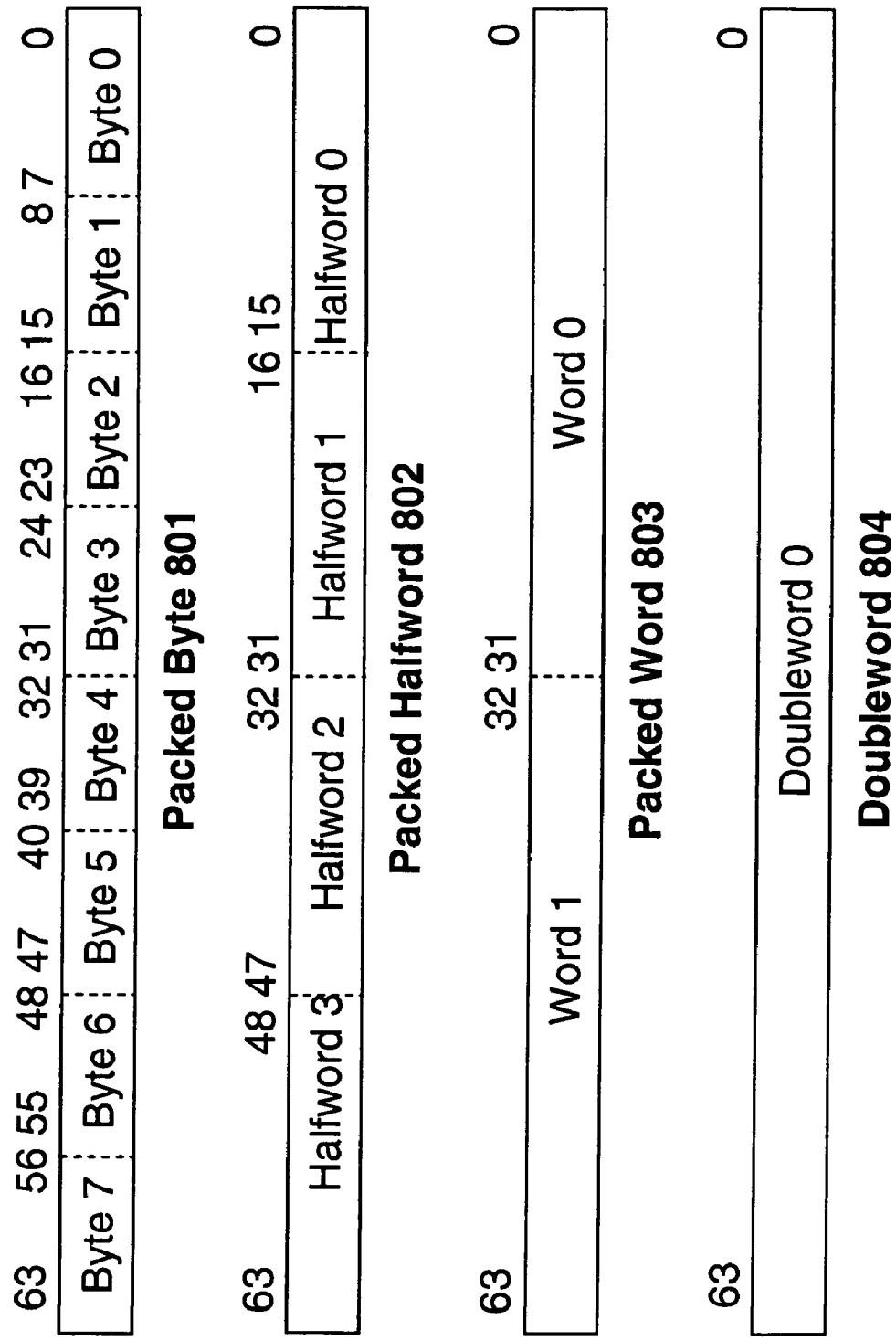
FIG. 8 is a depiction of alternative in-register data storage formats.

FIG. 8 illustrates alternative in-register fixed-point data storage formats. Each packed data includes more than one independent data element. Three packed data formats are illustrated; packed byte 801, packed half word 802 and packed word 803 together with double word 804. One embodiment of packed byte 801 is sixty-four bits long containing eight data elements. Each data element is one byte long. One alternative embodiment of packed byte 801 is one hundred twenty-eight bits long containing sixteen data elements. Generally, a data element is an individual piece of data that is stored in a single register (or memory location) with other data elements of the same length. In one embodiment of the present invention, the number of data elements stored in a register is sixty-four bits divided by the length in bits of a data element. In an alternative embodiment of the present invention, the number of data elements stored in a register is one hundred twenty-eight bits divided by the length in bits of a data element.

One embodiment of packed word 802 is sixty-four bits long and contains four half word data elements. Each half word data element contains sixteen bits of information.

One embodiment of packed word 803 is sixty-four bits long and contains two word data elements. Each word data element contains thirty-two bits of information.

It will be appreciated that such packed data formats may be further extended, for example, to 96-bits, 128-bits, 160-bits, 192-bits, 224-bits, 256-bits or more.

Description of Saturate/Unsaturate

As mentioned previously, opcode field 413 indicates for some operations whether said operations optionally saturate. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format of one embodiment is shown in Table 1.

TABLE 1

| Data Format | Minimum Value | Maximum Value |
| --- | --- | --- |
| Unsigned Byte | 0 | 255 |
| Signed Byte | −128 | 127 |
| Unsigned Half word | 0 | 65535 |
| Signed Half word | −32768 | 32767 |
| Unsigned Word | 0 | $2^{32} - 1$ |
| Signed Word | $-2^{31}$ | $2^{31} - 1$ |
| Unsigned Double word | 0 | $2^{64} - 1$ |
| Signed Double word | $-2^{63}$ | $2^{63} - 1$ |

As mentioned above, opcode field 413 indicates for some operations whether saturating operations are being performed. Therefore, using the unsigned byte data format, if an operation's result=258 and saturation was enabled, then the result would be clamped to 255 before being stored into the operation's destination register. Similarly, if an operation's result=−32999 and coprocessor 226 used a signed word data format with saturation enabled, then the result would be clamped to −32768 before being stored into the operation's destination register.

With no saturation, only the lower bits of the result are presented. With unsigned saturation (US), the bits from zero to the maximum unsigned value may be presented. With signed saturation (SS), bits from the maximum positive to the maximum negative values are presented. In the pseudocode that follows the saturation types US and SS are indicated in curly brackets, {US, SS}, to indicate they are optional, but it will be appreciated that for some alternative embodiments of certain operations saturation may not be optional.

For example a saturating operation having a full word (32 bit) source data in the least significant word position of register wRn and half word (16 bit) result data in the least significant half word position of register wRd is indicated as follows:

wRd[half 0]→saturate(wRn[word 0], {US,SS}, 16);

and saturation is optionally performed to the minimum and maximum unsigned or the minimum and maximum signed values represented by 16 bits.

Figure 9A:
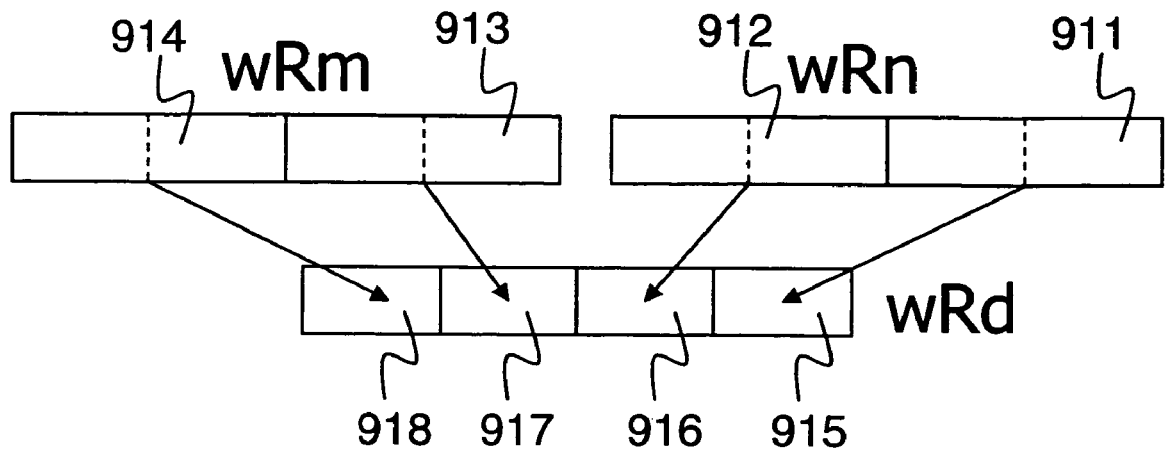
FIG. 9a illustrates one embodiment of a SIMD pack operation.

FIG. 9a illustrates one embodiment of a SIMD pack operation, which may store SIMD saturation history. The pack operation packs data from two source registers into a single destination register. The source data can be a half word, word, or double word. It can use signed saturation and unsigned saturation during packing. An operation encoding for one embodiment of the pack operation is may be summarized as shown in Table 2.

TABLE 2

| 31-28 | 27-24 | 23-20 | 19-16 | 15-12 | 11-8 | 7-5 | 4 | 3-0 |
| --- | --- | --- | --- | --- | --- | --- | --- | --- |
| Cond | 1110 | wwss | wRn | wRd | 0000 | 100 | 0 | wRm |

The values in bit positions 23 and 22 determine the source data size. A half word source data size is set for a value of 01, the word source data size is set for a value of 10, and a double word source data size is set for a value of 11. For one embodiment of the pack operation the result data size is half of the source data size but the invention is not so limited.

The values in positions 21 and 20 determine the saturation type. Unsigned saturation is specified by a value of 01 and signed saturation is specified by a value of 11. The saturation specified is performed to the result data size. For one embodiment of the pack operation, all source data are treated as signed values but the invention is not so limited.

For one embodiment of the pack instruction, data from wRn and wRm is packed into wRd, with wRm being packed in the upper half and wRn being packed in the lower half for vectors of 16, 32, or 64 bit source data and 8, 16, and 32-bit result data respectively. For example, a pack operation packing words into half words is illustrated in FIG. 9a. Source register wRm contains word data 914 and 913, which are packed into half word result data 918 and 917 respectively. Source register wRm contains word data 912 and 911, which are packed into half word result data 916 and 915 respectively. The results are saturated according to the saturation specified and placed in destination register wRd.

Figure 9B:
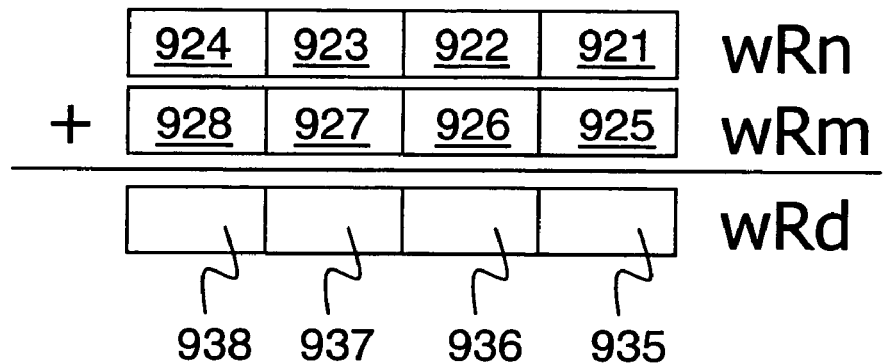
FIG. 9b illustrates one embodiment of a SIMD addition operation.

For one embodiment of the pack operation, packing can be performed with signed or unsigned saturation as shown below and SIMD saturation history may be stored according to which result data saturate. For a half word source data and byte result data:

wRd[byte 7]←saturate(wRm[half 3], {US,SS}, 8));
wCSSF[bit 7]←(saturate(wRm[half 3], {US,SS}, 8))≠wRm[half 3])|wCSSF[bit 7];
wRd[byte 6]←saturate(wRm[half 2], {US,SS}, 8);
wCSSF[bit 6]←(saturate(wRm[half 2], {US,SS}, 8))≠wRm[half 2])|wCSSF[bit 6];
wRd[byte 5]←saturate(wRm[half 1], {US,SS}, 8);
wCSSF[bit 5]←(saturate(wRm[half 1], {US,SS}, 8))≠wRm[half 1])|wCSSF[bit 5];
wRd[byte 4]←saturate(wRm[half 0], {US,SS}, 8);
wCSSF[bit 4]←(saturate(wRm[half 0], {US,SS}, 8))≠wRm[half 0])|wCSSF[bit 4];
wRd[byte 3]←saturate(wRn[half 3], {US,SS}, 8);
wCSSF[bit 3]←(saturate(wRn[half 3], {US,SS}, 8))≠wRn[half 3])|wCSSF[bit 3];
wRd[byte 2]←saturate(wRn[half 2], {US,SS}, 8);
wCSSF[bit 2]←(saturate(wRn[half 2], {US,SS}, 8))≠wRn[half 2])|wCSSF[bit 2];
wRd[byte 1]←saturate(wRn[half 1], {US,SS}, 8);
wCSSF[bit 1]←(saturate(wRn[half 1], {US,SS}, 8))≠wRn[half 1])|wCSSF[bit 1];
wRd[byte 0]←saturate(wRn[half 0], {US,SS}, 8);
wCSSF[bit 0]←(saturate(wRn[half 0], {US,SS}, 8))≠wRn[half 0])|wCSSF[bit 0];

For full word source data and half word result data:
wRd[half 3]←saturate(wRm[word 1], {US,SS}, 16);

wCSSF[bit 7]←(saturate(wRm[word 1], {US,SS}, 16))
≠wRm[word 1])|wCSSF[bit 7];
wRd[half 2]←saturate(wRm[word 0], {US,SS}, 16);
wCSSF[bit 5]←(saturate(wRm[word 0], {US,SS}, 16))
≠wRm[word 0])|wCSSF[bit 5];
wRd[half 1]←saturate(wRn[word 1], {US,SS}, 16);
wCSSF[bit 3]←(saturate(wRn[word 1], {US,SS}, 16))
≠wRn[word 1])|wCSSF[bit 3];
wRd[half 0]←saturate(wRn[word 0], {US,SS}, 16);
wCSSF[bit 1]←(saturate(wRn[word 0], {US,SS}, 16))
≠wRn[word 0])|wCSSF[bit 1];
For double word source data and word result data:
wRd[word 1]←saturate(wRm, {US,SS}, 32);
wCSSF[bit 7]←(saturate(wRm, {US,SS}, 32))≠wRm)
|wCSSF[bit 7];
wRd[word 0]←saturate(wRn, {US,SS}, 32);
wCSSF[bit 3]←(saturate(wRn, {US,SS}, 32))≠wRn)|wCSSF[bit 3];

For one embodiment of the pack operation the SIMD saturation history is sticky as shown above, wherein the saturation bit will stay set after being set once. For an alternative embodiment, the SIMD saturation history is not sticky. An example of packing double word source data to word result data with non-sticky SIMD saturation history follows:
wRd[word 1]←saturate(wRm, {US,SS}, 32);
wCSSF[bit 7]←(saturate(wRm, {US,SS}, 32))≠wRm);
wCSSF[bit 6-bit 4]←000;
wRd[word 0]←saturate(wRn, {US,SS}, 32);
wCSSF[bit 3]←(saturate(wRn, {US,SS}, 32))≠wRn);
wCSSF[bit 2-bit 0]←000;

FIG. 9b illustrates an alternative embodiment of a SIMD add operation which may store SIMD saturation history. The add instruction performs vector addition of source register (wRn and wRm) contents for vectors of 8, 16, or 32 bit signed or unsigned data. The instruction places the result in destination register wRd. For one embodiment of the add operation, saturation can be specified as signed, unsigned, or no saturation.

An operation encoding for one embodiment of the SIMD add operation is may be summarized as shown in Table 3.

TABLE 3

| 31-28 | 27-24 | 23-20 | 19-16 | 15-12 | 11-8 | 7-5 | 4 | 3-0 |
|---|---|---|---|---|---|---|---|---|
| Cond | 1110 | wwss | wRn | wRd | 0001 | 100 | 0 | wRm |

The values in bit positions 23 and 22 determine the source data size. A byte source data size is set for a value of 00, a half word source data size is set for a value of 01, and a word source data size is set for a value of 10. For one embodiment of the SIMD add operation the result data size is the same as the source data size but the invention is not so limited. For an alternative embodiment of the SIMD add operation the result data size is less than the source data size.

The values in positions 21 and 20 determine the saturation type. No saturation is specified by a value of 00, unsigned saturation is specified by a value of 01 and signed saturation is specified by a value of 11. The saturation specified is performed to the result data size.

For example, a SIMD add operation adding half words is illustrated in FIG. 9b. Source register wRn contains half word data 924, 923, 922 and 921, which are added to half word data 928, 927, 926 and 925 respectively of register wRm. The respective half word results, 938, 937, 936 and 935, are saturated according to the saturation specified and placed in destination register wRd. For one embodiment of the SIMD add operation, addition can be performed with signed or unsigned saturation as shown below and SIMD saturation history may be stored according to which result data saturate. For byte result data:
wRd[byte 7]←saturate(wRn[byte 7]+wRm[byte 7], {US,SS}, 8)
wCSSF[bit 7]←(wRd[byte 7]≠(wRn[byte 7]+wRm[byte 7]))|wCSSF[bit 7]
wRd[byte 6]←saturate(wRn[byte 6]+wRm[byte 6], {US,SS}, 8)
wCSSF[bit 6]←(wRd[byte 6]≠(wRn[byte 6]+wRm[byte 6]))|wCSSF[bit 6]
wRd[byte 5]←saturate(wRn[byte 5]+wRm[byte 5], {US,SS}, 8)
wCSSF[bit 5]←(wRd[byte 5]≠(wRn[byte 5]+wRm[byte 5]))|wCSSF[bit 5]
wRd[byte 4]←saturate(wRn[byte 4]+wRm[byte 4], {US,SS}, 8)
wCSSF[bit 4]←(wRd[byte 4]≠(wRn[byte 4]+wRm[byte 4]))|wCSSF[bit 4]
wRd[byte 3]←saturate(wRn[byte 3]+wRm[byte 3], {US,SS}, 8)
wCSSF[bit 3]←(wRd[byte 3]≠(wRn[byte 3]+wRm[byte 3]))|wCSSF[bit 3]
wRd[byte 2]←saturate(wRn[byte 2]+wRm[byte 2], {US,SS}, 8)
wCSSF[bit 2]←(wRd[byte 2]≠(wRn[byte 2]+wRm[byte 2]))|wCSSF[bit 2]
wRd[byte 1]←saturate(wRn[byte 1]+wRm[byte 1], {US,SS}, 8)
wCSSF[bit 1]←(wRd[byte 1]≠(wRn[byte 1]+wRm[byte 1]))|wCSSF[bit 1]
wRd[byte 0]←saturate(wRn[byte 0]+wRm[byte 0], {US,SS}, 8)
wCSSF[bit 0]←(wRd[byte 0]≠(wRn[byte 0]+wRm[byte 0]))|wCSSF[bit 0]
For half word result data:
wRd[half 3]←saturate(wRn[half 3]+wRm[half 3], {US,SS}, 16)
wCSSF[bit 7]←(wRd[half 3]≠(wRn[half 3]+wRm[half 3]))|wCSSF[bit 7]
wRd[half 2]←saturate(wRn[half 2]+wRm[half 2], {US,SS}, 16)
wCSSF[bit 5]←(wRd[half 2]≠(wRn[half 2]+wRm[half 2]))|wCSSF[bit 5]
wRd[half 1]←saturate(wRn[half 1]+wRm[half 1], {US,SS}, 16)
wCSSF[bit 3]←(wRd[half 1]≠(wRn[half 1]+wRm[half 1]))|wCSSF[bit 3]
wRd[half 0]←saturate(wRn[half 0]+wRm[half 0], {US,SS}, 16)
wCSSF[bit 1]←(wRd[half 0]≠(wRn[half 0]+wRm[half 0]))|wCSSF[bit 1]
For word result data:
wRd[word 1]←saturate(wRn[word 1]+wRm[word 1], {US,SS}, 32)
wCSSF[bit 7]←(wRd[word 1]≠(wRn[word 1]+wRm[word 1]))|wCSSF[bit 7]
wRd[word 0]←saturate(wRn[word 0]+wRm[word 0], {US,SS}, 32)
wCSSF[bit 3]←(wRd[word 0]≠(wRn[word 0]+wRm[word 0]))|wCSSF[bit 3]

For one embodiment of the SIMD add operation the SIMD saturation history is sticky as shown above. For an alternative embodiment, the SIMD saturation history is not sticky.

Figure 9C:
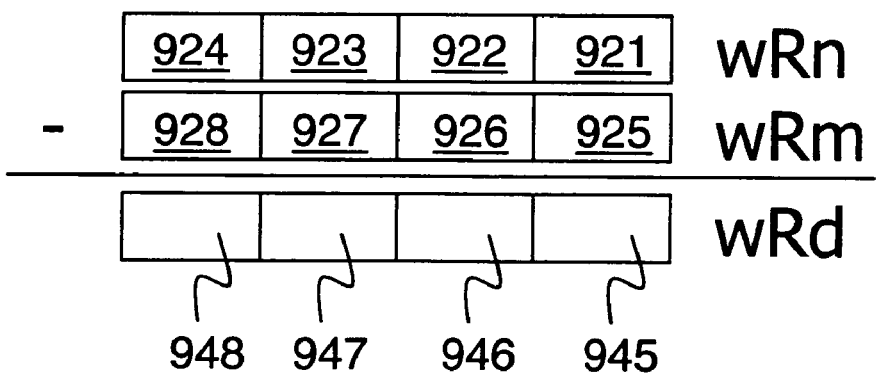
FIG. 9c illustrates one embodiment of a SIMD subtraction operation.

FIG. 9c illustrates another alternative embodiment of a SIMD subtract operation which may store SIMD saturation history. The subtract instruction performs vector subtraction of source register (wRn and wRm) contents for vectors of 8, 16, or 32 bit signed or unsigned data. The instruction places the result in destination register wRd. For one embodiment of the subtract operation, saturation can be specified as signed, unsigned, or no saturation.

An operation encoding for one embodiment of the SIMD subtract operation may be summarized as shown in Table 4.

TABLE 4

| 31-28 | 27-24 | 23-20 | 19-16 | 15-12 | 11-8 | 7-5 | 4 | 3-0 |
|---|---|---|---|---|---|---|---|---|
| Cond | 1110 | wwss | wRn | wRd | 0001 | 101 | 0 | wRm |

The values in bit positions 23 and 22 determine the source data size. For one embodiment of the SIMD subtract operation data size is specified in the same way as the SIMD add operation. The values in positions 21 and 20 determine the saturation type. For one embodiment of the SIMD subtract operation saturation is specified in the same way as the SIMD add operation.

For example, a SIMD subtract operation subtracting half words is illustrated in FIG. 9c. Source register wRn contains half word data 924, 923, 922 and 921, from which are subtracted half word data 928, 927, 926 and 925 respectively of register wRm. The respective half word results, 948, 947, 946 and 945, are saturated according to the saturation specified and placed in destination register wRd. For one embodiment of the SIMD subtraction operation, subtraction can be performed with signed or unsigned saturation as shown below and SIMD saturation history may be stored according to which result data saturate. For byte result data:

wRd[byte 7]←saturate(wRn[byte 7]−wRm[byte 7], {US, SS}, 8)
wCSSF[bit 7]←(wRd[byte 7]≠(wRn[byte 7]−wRm[byte 7]))|wCSSF[bit 7]
wRd[byte 6]←saturate(wRn[byte 6]−wRm[byte 6], {US, SS}, 8)
wCSSF[bit 6]←(wRd[byte 6]≠(wRn[byte 6]−wRm[byte 6]))|wCSSF[bit 6]
wRd[byte 5]←saturate(wRn[byte 5]−wRm[byte 5], {US, SS}, 8)
wCSSF[bit 5]←(wRd[byte 5]≠(wRn[byte 5]−wRm[byte 5]))|wCSSF[bit 5]
wRd[byte 4]←saturate(wRn[byte 4]−wRm[byte 4], {US, SS}, 8)
wCSSF[bit 4]←(wRd[byte 4]≠(wRn[byte 4]−wRm[byte 4]))|wCSSF[bit 4]
wRd[byte 3]←saturate(wRn[byte 3]−wRm[byte 3], {US, SS}, 8)
wCSSF[bit 3]←(wRd[byte 3]≠(wRn[byte 3]−wRm[byte 3]))|wCSSF[bit 3]
wRd[byte 2]←saturate(wRn[byte 2]−wRm[byte 2], {US, SS}, 8)
wCSSF[bit 2]←(wRd[byte 2]≠(wRn[byte 2]−wRm[byte 2]))|wCSSF[bit 2]
wRd[byte 1]←saturate(wRn[byte 1]−wRm[byte 1], {US, SS}, 8)
wCSSF[bit 1]←(wRd[byte 1]≠(wRn[byte 1]−wRm[byte 1]))|wCSSF[bit 1]
wRd[byte 0]←saturate(wRn[byte 0]−wRm[byte 0], {US, SS}, 8)
wCSSF[bit 0]←(wRd[byte 0]≠(wRn[byte 0]−wRm[byte 0]))|wCSSF[bit 0]

For half word result data:
wRd[half 3]←saturate(wRn[half 3]−wRm[half 3], {US, SS}, 16)
wCSSF[bit 7]←(wRd[half 3]≠(wRn[half 3]−wRm[half 3]))|wCSSF[bit 7]
wRd[half 2]←saturate(wRn[half 2]−wRm[half 2], {US, SS}, 16)
wCSSF[bit 5]←(wRd[half 2]≠(wRn[half 2]−wRm[half 2]))|wCSSF[bit 5]
wRd[half 1]←saturate(wRn[half 1]−wRm[half 1], {US, SS}, 16)
wCSSF[bit 3]←(wRd[half 1]≠(wRn[half 1]−wRm[half 1]))|wCSSF[bit 3]
wRd[half 0]←saturate(wRn[half 0]−wRm[half 0], {US, SS}, 16)
wCSSF[bit 1]←(wRd[half 0]≠(wRn[half 0]−wRm[half 0]))|wCSSF[bit 1]
For word result data:
wRd[word 1]←saturate(wRn[word 1]−wRm[word 1], {US,SS}, 32)
wCSSF[bit 7]←(wRd[word 1]≠(wRn[word 1]−wRm[word 1]))|wCSSF[bit 7]
wRd[word 0]←saturate(wRn[word 0]−wRm[word 0], {US,SS}, 32)
wCSSF[bit 3]←(wRd[word 0]≠(wRn[word 0]−wRm[word 0]))|wCSSF[bit 3]

For one embodiment of the SIMD subtract operation the SIMD saturation history is sticky as shown above. For an alternative embodiment, the SIMD saturation history is not sticky.

It will be appreciated that SIMD operations, which may store SIMD saturation history can be used to perform essential computations on packed data and conversions between representations of varying precision. One embodiment of processing core 120 or of processing core 220 or of coprocessor 226 or of coprocessor 301 can execute SIMD instructions to perform a SIMD pack, a SIMD add and a SIMD subtract operation, each of which may store SIMD saturation history. One alternative embodiment of processing core 120 or of processing core 220 or of coprocessor 226 or of coprocessor 301 can execute other SIMD instructions to perform operations which may store SIMD saturation history.

Figure 9D:
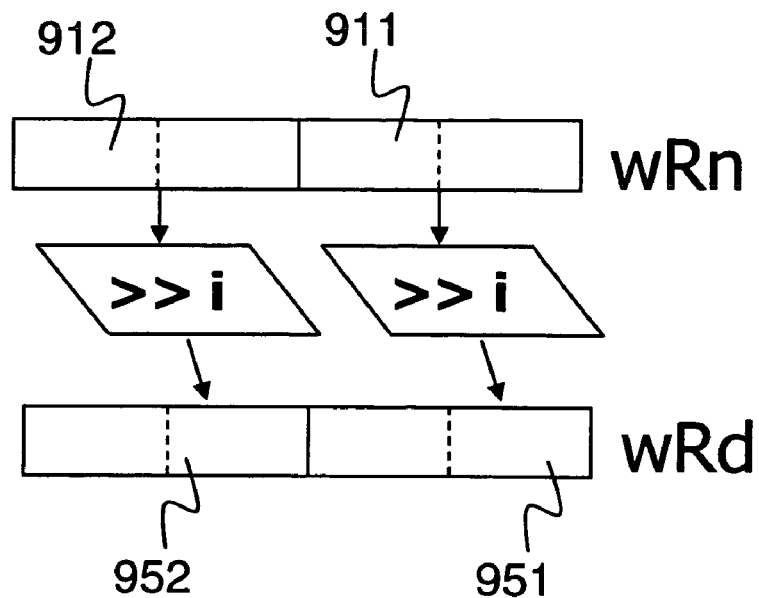
FIG. 9d illustrates one embodiment of a SIMD operation for shifting data.

FIG. 9d illustrates an embodiment of a SIMD operation for shifting data. The shift right instruction performs independent shifting of source register (wRn) contents for vectors of 16, 32 or 64 bit signed or unsigned data. The instruction places the result in destination register wRd.

An operation encoding for one embodiment of the SIMD shift right operation may be summarized as shown in Table 5.

TABLE 5

| 31-28 | 27-24 | 23-20 | 19-16 | 15-12 | 11-8 | 7-5 | 4 | 3-0 |
|---|---|---|---|---|---|---|---|---|
| Cond | 1110 | ww10 | wRn | wRd | 000g | 010 | 0 | wRm/wCGRn |

The values in bit positions 23 and 22 determine the source data size. A half word source data size is set for a value of 01, a word source data size is set for a value of 10, and a double word source data size is set for a value of 11. For an alternative embodiment of the shift right operation, a byte source data size is set for a value of 00.

Figure 9E:
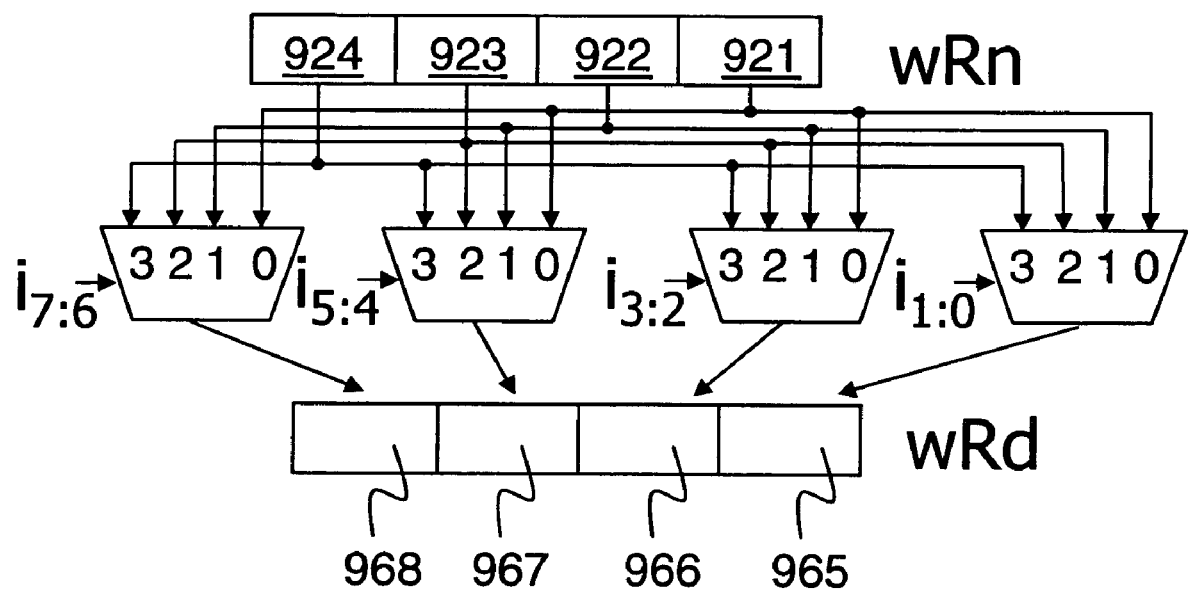
FIG. 9e illustrates one embodiment of a SIMD operation for shuffling data.

FIG. 9e illustrates an alternative embodiment of a SIMD operation for shuffling data. The shuffle instruction selects half word data values for results from half word data values in the source register (wRn) according to an 8-bit immediate value. The instruction places the results in destination register wRd.

An operation encoding for one embodiment of the SIMD shuffle operation may be summarized as shown in Table 6.

TABLE 6

| 31-28 | 27-24 | 23-20 | 19-16 | 15-12 | 11-8 | 7-5 | 4 | 3-0 |
|---|---|---|---|---|---|---|---|---|
| Cond | 1110 | Im[7:4] | wRn | wRd | 0001 | 111 | 0 | Im[3:0] |

For example, a SIMD shuffle operation on half word data is illustrated in FIG. 9e. Source register wRn contains half word data 924, 923, 922, 921, which are selected as results according to the value of bits in immediate, $i_{7:0}$. Each of the half word results, 968, 967, 966 and 965, are set to the value of one of the half word source data corresponding to the value of two-bit fields $i_{7:6}$, $i_{5:4}$, $i_{3:2}$ and $i_{1:0}$ respectively. For shuffling half word result data:

wRd[half 3]←wRn[half Im[7:6]]
wRd[half 2]←wRn[half Im[5:4]]
wRd[half 1]←wRn[half Im[3:2]]
wRd[half 0]←wRn[half Im[1:0]]

Figure 10A:
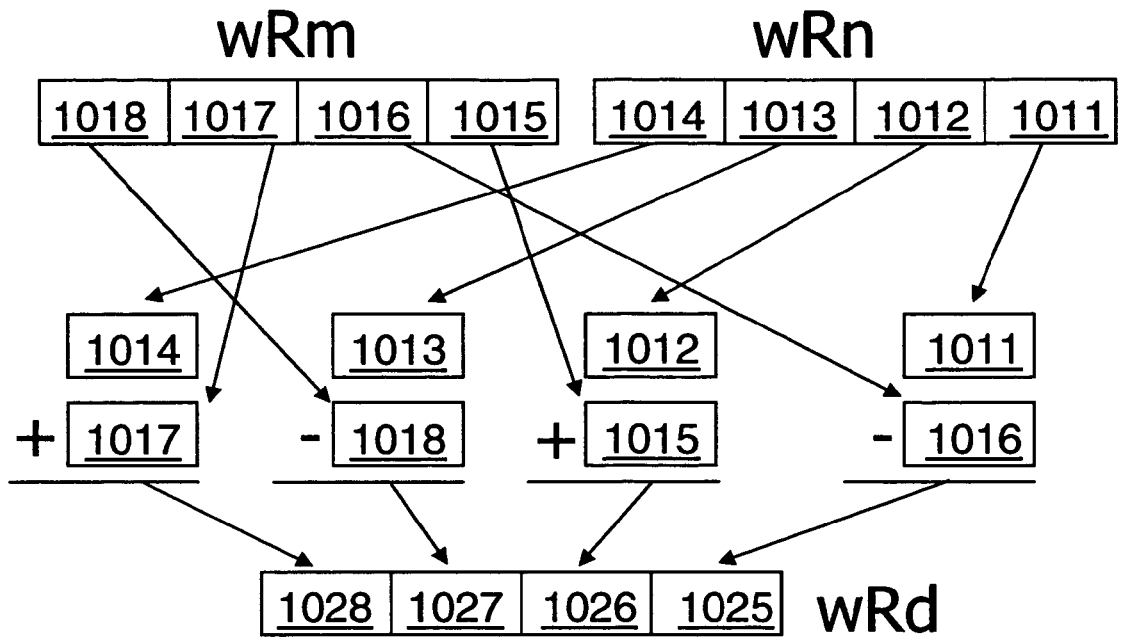
FIG. 10a illustrates one embodiment of a SIMD subtraction-addition operation.

FIG. 10a illustrates another alternative embodiment of a SIMD complex subtraction-addition operation, which may store SIMD saturation history. One embodiment of the complex subtraction-addition instruction performs complex vector subtraction-addition of source register (wRn and wRm) contents for vectors of 16 bit signed data. An alternative embodiment of the complex subtraction-addition instruction performs complex vector subtraction-addition for vectors of 8, 16, or 32 bit signed or unsigned data. The instruction places the result in destination register wRd. For one embodiment of the complex vector subtraction-addition operation, signed saturation of result data is performed. For an alternative embodiment of the complex vector subtraction-addition operation, saturation can be specified as signed, unsigned, or no saturation.

An operation encoding for one embodiment of the SIMD complex subtraction-addition operation may be summarized as shown in Table 7.

TABLE 7

| 31-28 | 27-24 | 23-20 | 19-16 | 15-12 | 11-8 | 7-5 | 4 | 3-0 |
|---|---|---|---|---|---|---|---|---|
| Cond | 1110 | 1101 | wRn | wRd | 0001 | 110 | 0 | wRm |

For example, a SIMD complex subtraction-addition operation on half word data is illustrated in FIG. 10a. Source register wRn contains half word data 1013 and 1011, from which are subtracted half word data 1018 and 1016 respectively of register wRm. The respective half word results, 1027 and 1025, are saturated and placed in destination register wRd. Source register wRn also contains half word data 1014 and 1012, to which are added half word data 1017 and 1015 respectively of register wRm. The respective half word results, 1028 and 1026, are saturated and placed in destination register wRd. For one embodiment of the SIMD complex subtraction-addition operation, subtraction and addition can be performed with signed saturation as shown below and SIMD saturation history may be stored according to which result data saturate. For half word result data:

wRd[half 3]←saturate(wRn[half 3]+wRm[half 2], {US, SS}, 16)
wCSSF[bit 7]←(wRd[half 3]≠(wRn[half 3]+wRm[half 2]))|wCSSF[bit 7]
wRd[half 2]←saturate(wRn[half 2]−wRm[half 3], {US, SS}, 16)
wCSSF[bit 5]←(wRd[half 2]≠(wRn[half 2]−wRm[half 3]))|wCSSF[bit 5]
wRd[half 1]←saturate(wRn[half 1]+wRm[half 0], {US, SS}, 16)
wCSSF[bit 3]←(wRd[half 1]≠(wRn[half 1]+wRm[half 0]))|wCSSF[bit 3]
wRd[half 0]←saturate(wRn[half 0]−wRm[half 1], {US, SS}, 16)
wCSSF[bit 1]←(wRd[half 0]≠(wRn[half 0]−wRm[half 1]))|wCSSF[bit 1]

It will be appreciated that such a complex subtraction-addition operation may provide for butterfly operations on real and complex data, for example in a discrete cosine transformation (DCT) or a fast Fourier transform (FFT). For one embodiment of the SIMD complex subtraction-addition operation the SIMD saturation history is sticky as shown above. For an alternative embodiment, the SIMD saturation history is not sticky.

Figure 10B:
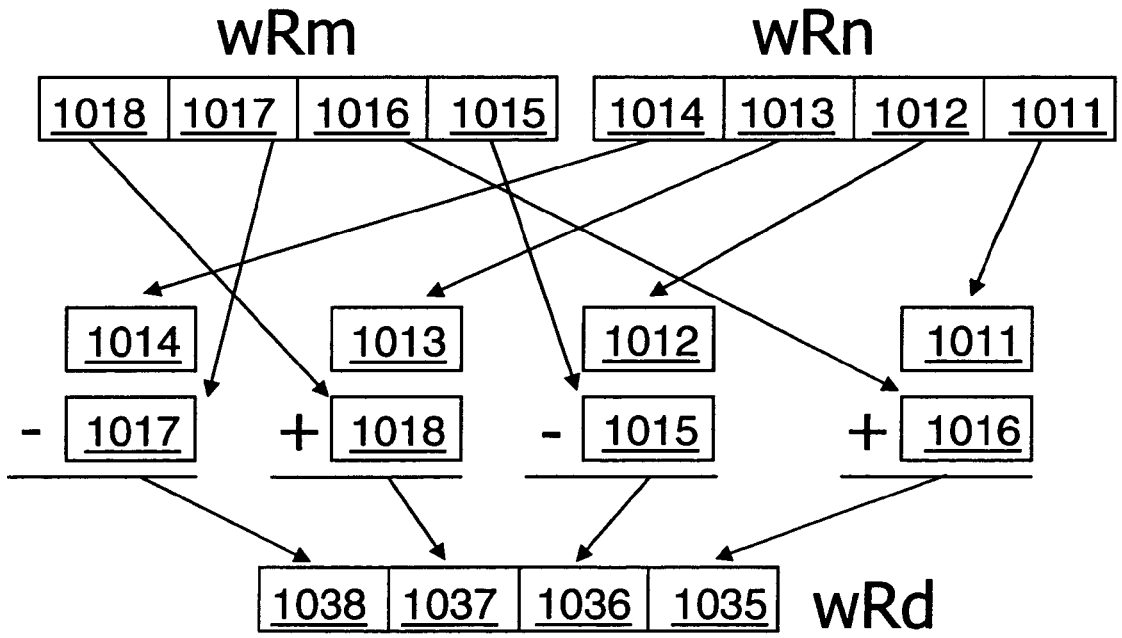
FIG. 10b illustrates an alternative embodiment of a SIMD addition-subtraction operation.

FIG. 10b illustrates another alternative embodiment of a SIMD complex addition-subtraction operation which may store SIMD saturation history. One embodiment of the complex addition-subtraction instruction performs complex vector addition-subtraction of source register (wRn and wRm) contents for vectors of 16 bit signed data. An alternative embodiment of the complex addition-subtraction instruction performs complex vector addition-subtraction for vectors of 8, 16, or 32 bit signed or unsigned data. The instruction places the result in destination register wRd. For one embodiment of the complex vector addition-subtraction operation, signed saturation of result data is performed. For an alternative embodiment of the complex vector addition-subtraction operation, saturation can be specified as signed, unsigned, or no saturation.

An operation encoding for one embodiment of the SIMD complex addition-subtraction operation may be summarized as shown in Table 8.

TABLE 8

| 31-28 | 27-24 | 23-20 | 19-16 | 15-12 | 11-8 | 7-5 | 4 | 3-0 |
|---|---|---|---|---|---|---|---|---|
| Cond | 1110 | 1010 | wRn | wRd | 0001 | 101 | 0 | wRm |

For example, a SIMD complex addition-subtraction operation on half word data is illustrated in FIG. 10b. Source register wRn contains half word data 1013 and 1011, to which are added half word data 1018 and 1016 respectively of register wRm. The respective half word results, 1037 and 1035, are saturated and placed in destination register wRd. Source register wRn also contains half word data 1014 and 1012, from which are subtracted half word data 1017 and 1015 respectively of register wRm. The respective half word results, 1038 and 1036, are saturated and placed in destination register wRd. For one embodiment of the SIMD complex addition-subtraction operation, addition and subtraction can be performed with signed saturation as shown below and SIMD saturation history may be stored according to which result data saturate. For half word result data:

wRd[half 3]←saturate(wRn[half 3]−wRm[half 2], {US, SS}, 16)
wCSSF[bit 7]←(wRd[half 3]≠(wRn[half 3]−wRm[half 2]))|wCSSF[bit 7]

wRd[half 2]←saturate(wRn[half 2]+wRm[half 3], {US, SS}, 16)

wCSSF[bit 5]←(wRd[half 2]≠(wRn[half 2]+wRm[half 3]))|wCSSF[bit 5]

wRd[half 1]←saturate(wRn[half 1]−wRm[half 0], {US, SS}, 16)

wCSSF[bit 3]←(wRd[half 1]≠(wRn[half 1]−wRm[half 0]))|wCSSF[bit 3]

wRd[half 0]←saturate(wRn[half 0]+wRm[half 1], {US, SS}, 16)

wCSSF[bit 1]←(wRd[half 0]≠(wRn[half 0]+wRm[half 1]))|wCSSF[bit 1]

Figure 11:
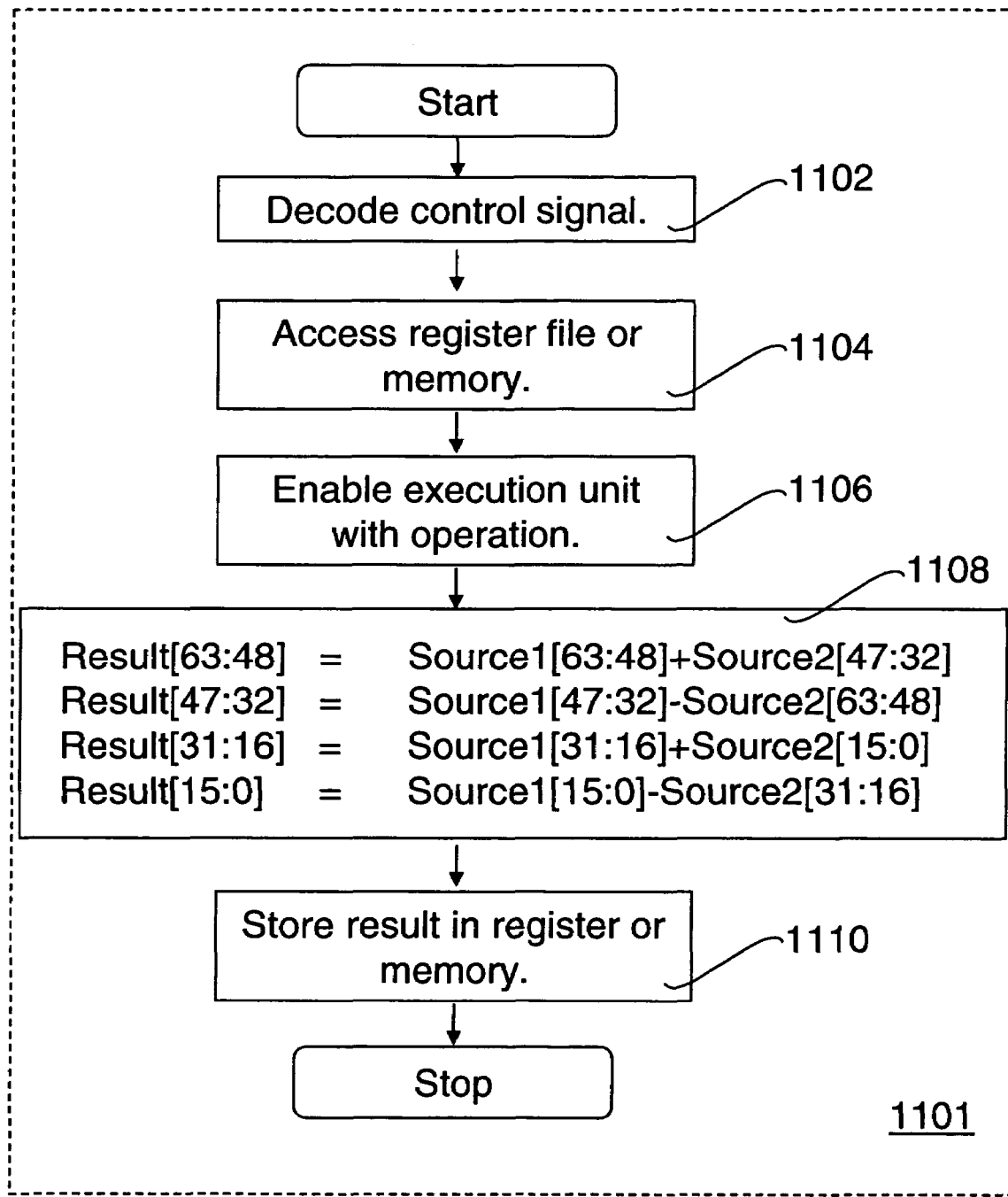
FIG. 11 illustrates a flow chart for one embodiment of a process to perform a SIMD subtraction-addition operation.

FIG. 11 illustrates a flow chart for one embodiment of a process 1101 to perform a complex SIMD subtraction-addition operation. Process 1101 and other processes herein disclosed are performed by processing blocks that may comprise dedicated hardware or software or firmware operation codes executable by general purpose machines or by special purpose machines or by a combination of both.

In processing block 1102 a coprocessor instruction is decoded identifying a complex SIMD subtraction-addition operation. The processing flow proceeds to processing block 1104 where operands, Source1 and Source2 are accessed from a register file or from memory. In processing block 1106, an execution unit is enabled with the complex SIMD subtraction-addition operation and processing flow proceeds to processing block 1108. In processing block 1108, the result data elements are computed as: Source1[63:48]+Source2[47:32] for Result[63:48], Source1[47:32]−Source2[63:48]for Result[47:32], Source1[31:16]+Source2[15:0] for Result[31:16], and Source1[15:0]−Source2[31:16] for Result[15:0]. Finally in processing block 1110, the computed result is stored to the register file or memory and the process terminates.

Figure 12:
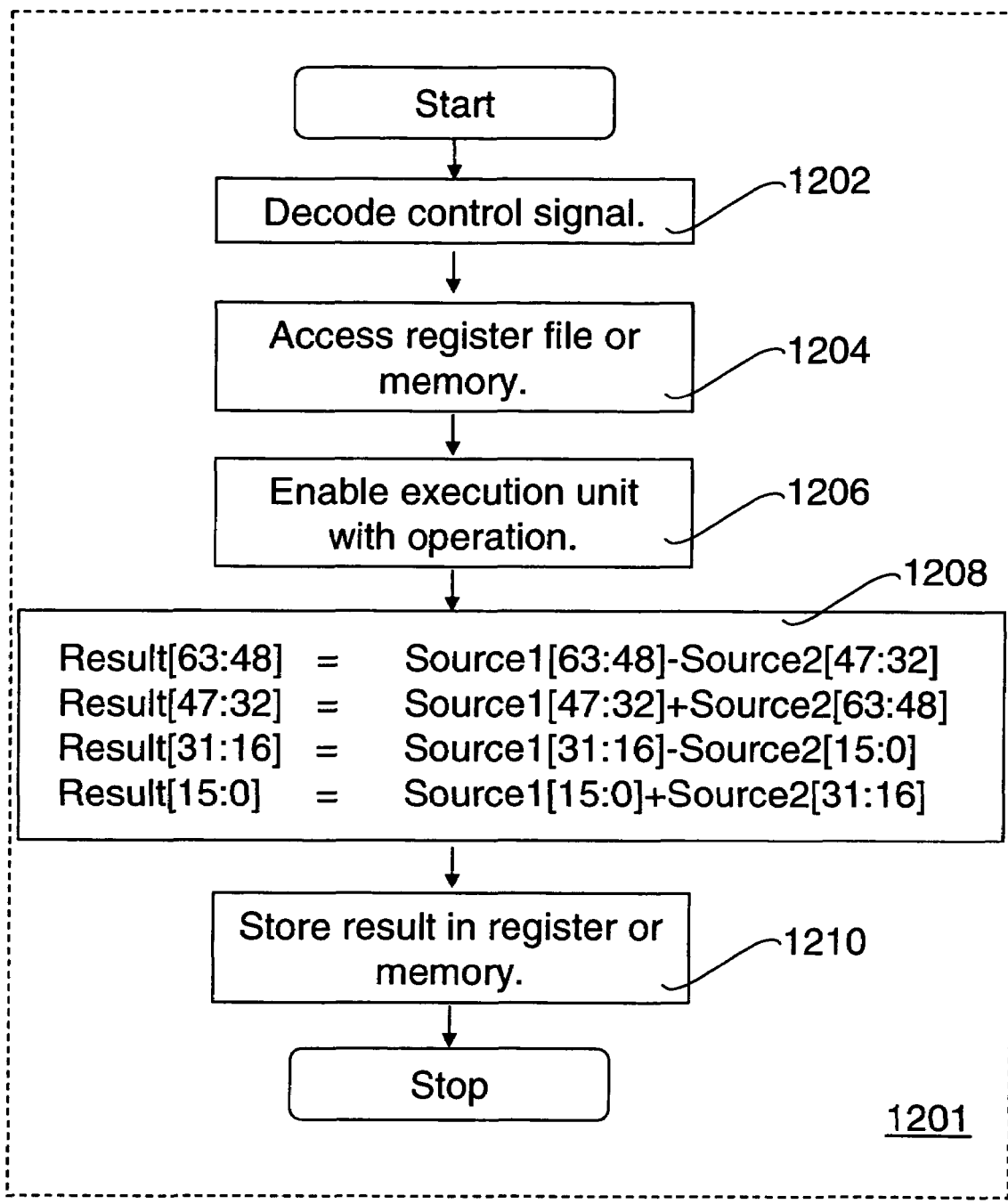
FIG. 12 illustrates a flow chart for an alternative embodiment of a process to perform a SIMD addition-subtraction operation.

FIG. 12 illustrates a flow chart for an alternative embodiment of a process 1201 to perform a complex SIMD addition-subtraction operation. In processing block 1202 a coprocessor instruction is decoded identifying a complex SIMD addition-subtraction operation. In processing block 1204 operands, Source1 and Source2, are accessed from a register file or from memory and processing flow proceeds to processing block 1206. In processing block 1206, an execution unit is enabled with the complex SIMD addition-subtraction operation and processing flow proceeds to processing block 1208. In processing block 1208, the result data elements are computed as: Source1[63:48]−Source2[47:32] for Result[63:48], Source1[47:32]+Source2[63:48] for Result[47:32], Source1[31:16]−Source2[15:0] for Result[31:16], and Source1[15:0]+Source2[31:16] for Result[15:0]. Then in processing block 1210, the computed result is stored to the register file or memory and the process terminates.

Figure 13A:
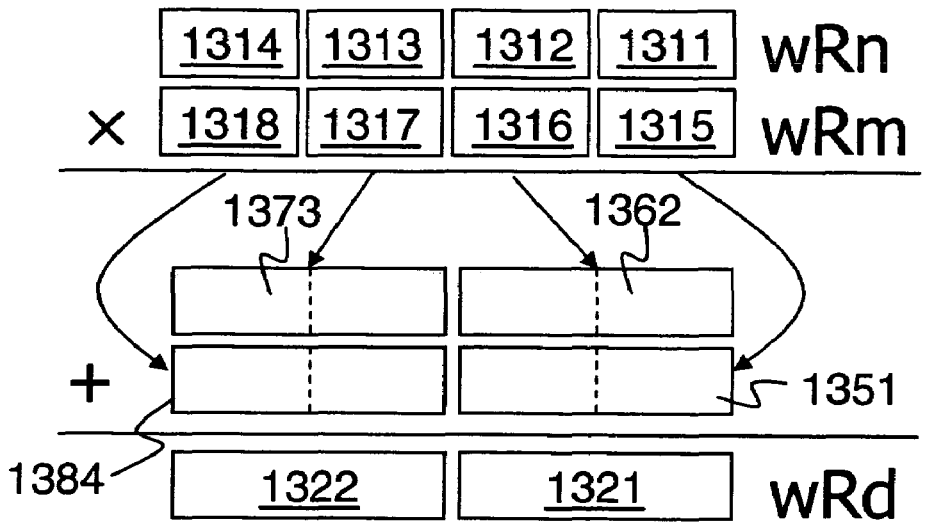
FIG. 13a illustrates one embodiment of a SIMD multiply-add operation.

FIG. 13a illustrates an embodiment of a SIMD multiply and add operation, which may store SIMD saturation history. The multiply and add instruction performs multiplication of 16-bit source data of register wRn and 16-bit source data of register wRm. The intermediate products of the multiplications are added together in pairs to produce packed 32-bit sums, which are stored in destination register wRd.

An operation encoding for one embodiment of the SIMD multiply and add operation may be summarized as shown in Table 9.

TABLE 9

| 31-28 | 27-24 | 23-20 | 19-16 | 15-12 | 11-8 | 7-5 | 4 | 3-0 |
|---|---|---|---|---|---|---|---|---|
| Cond | 1110 | nnsx | wRn | wRd | 0001 | sss | 0 | wRm |

For one alternative embodiment of the multiply and add operation, the values in bit positions 23-22 determine whether a multiply and add (nn=10) or a multiply and subtract (nn=11) operation will be preformed. For another alternative embodiment of the multiply and add operation, the value in bit position 20 determines whether a cross-multiply and add is performed. The values in bit positions 21 and 7-5 determine whether one of signed arithmetic with saturation, signed arithmetic without saturation, unsigned arithmetic with saturation or unsigned arithmetic without saturation will be performed. Saturation is performed to the result data size of 32-bits. For one embodiment, when bit position 21 is set (one) signed arithmetic is used. For one alternative embodiment, when bit positions 7-5 are all cleared (all zero) no saturation is performed and the results are truncated to the result data size of 32-bits.

For example, one embodiment of a SIMD multiply and add operation is illustrated in FIG. 13a. Source register wRn contains half word data 1314-1311. Source register wRm contains half word data 1318-1315. Multiplication operands 1314 and 1318 are multiplied together to produce intermediate result 1384 and multiplication operands 1313 and 1317 are multiplied together to produce intermediate result 1373. Intermediate results 1384 and 1373 are added, optionally with saturation, to produce the word result 1322. Multiplication operands 1312 and 1316 are multiplied together to produce intermediate result 1362 and multiplication operands 1311 and 1315 are multiplied together to produce intermediate result 1351. Intermediate results 1362 and 1351 are added, optionally with saturation, to produce the word result 1321. The two word results 1322 and 1321 are stored in destination register wRd.

Figure 13B:
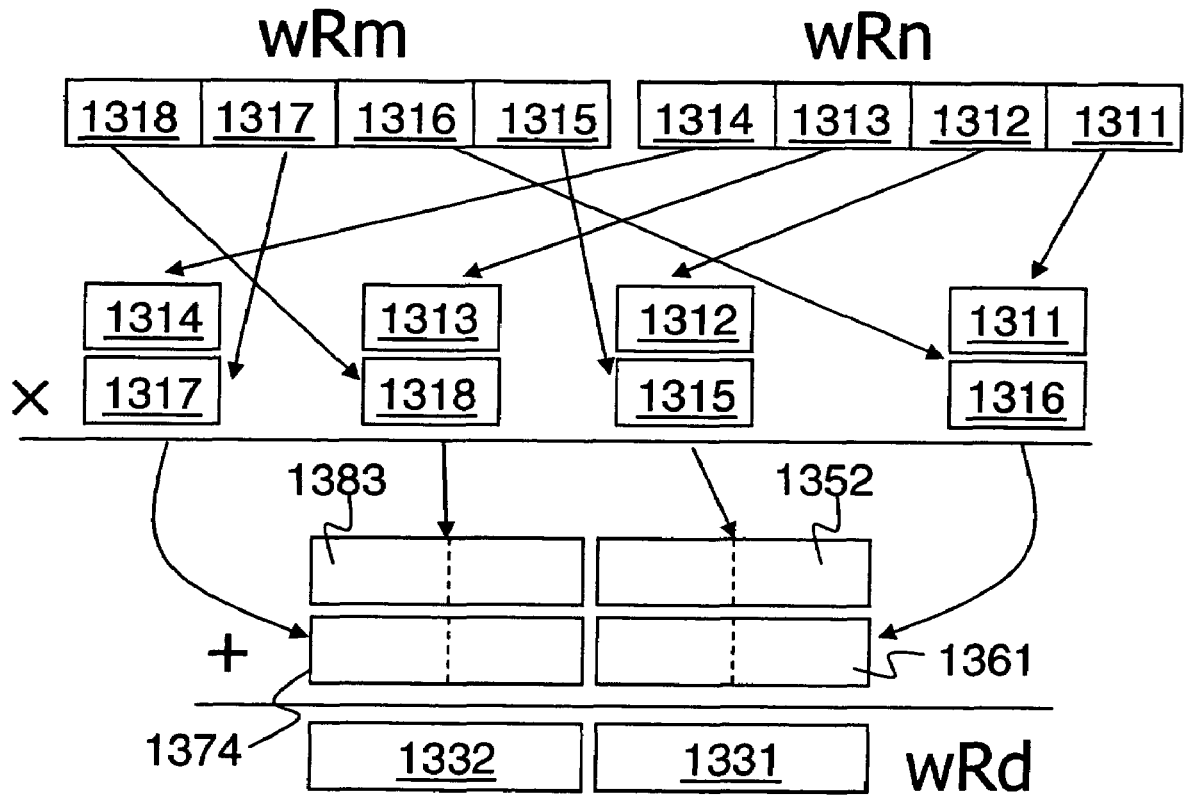
FIG. 13b illustrates an alternative embodiment of a SIMD multiply-add operation.

FIG. 13b illustrates an alternative embodiment of a SIMD cross-multiply and add operation. For alternative embodiments of the operation, operands may be cross multiplied and addition performed with signed or unsigned saturation as shown below with SIMD saturation history stored according to which result data saturate. For word result data:

Temp1361←wRn[half 0]*wRm[half 1];

Temp1352←wRn[half 1]*wRm[half 0];

Temp1383←wRn[half 2]*wRm[half 3];

Temp1374←wRn[half 3]*wRm[half 2];

wRd[word 1]←saturate(Temp1383+Temp1374, {US, SS}, 32);

wCSSF[bit 7]←(wRd[word 1]≠(Temp1383+Temp1374))|wCSSF[bit 7];

wRd[word 0]←saturate(Temp1361+Temp1352, {US, SS}, 32);

wCSSF[bit 3]←(wRd[word 0]≠(Temp1361+Temp1352))|wCSSF[bit 3];

For one alternative embodiment the instruction optionally negates the most significant intermediate product of each pair as the pairs are added to produce packed 32-bit differences, which are stored in destination register wRd. For other alternative embodiments of the multiply and add operation, saturation can be specified as signed or unsigned, or no saturation is applied.

Figure 13C:
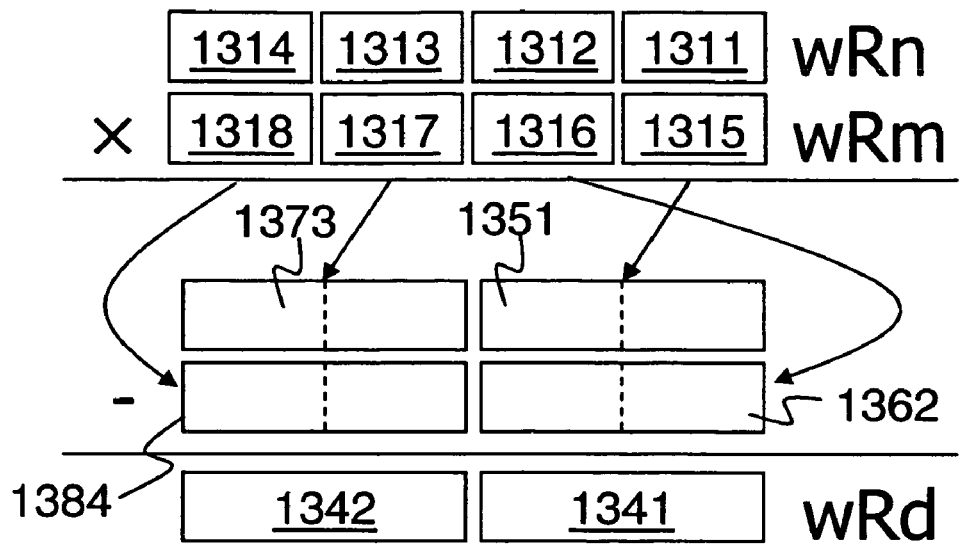
FIG. 13c illustrates an alternative embodiment of a SIMD multiply-subtract operation.

FIG. 13c illustrates an alternative embodiment of a SIMD multiply and subtract operation, which may store SIMD saturation history. For one embodiment of the SIMD multiply and add operation, addition or subtraction of products can be performed with signed or unsigned saturation as shown below and SIMD saturation history may be stored according to which result data saturate. For word result data:

```
Temp1351 ← wRn[half 0] * wRm[half 0];
Temp1362 ← wRn[half 1] * wRm[half 1];
Temp1373 ← wRn[half 2] * wRm[half 2];
Temp1384 ← wRn[half 3] * wRm[half 3];
If (nn = 11) then {
    wRd[word 1] ←saturate(Temp1373 − Temp1384, {US,SS}, 32);
    wCSSF[bit 7] ← (wRd[word 1] ≠ (Temp1373 − Temp1384) ) |
    wCSSF[bit 7];
    wRd[word 0] ←saturate(Temp1351 − Temp1362, {US,SS}, 32);
    wCSSF[bit 3] ← (wRd[word 0] ≠ (Temp1351 − Temp1362) ) |
    wCSSF[bit 3];
}
Else If (nn = 10) then {
    wRd[word 1] ←saturate(Temp1373 + Temp1384, {US,SS}, 32);
    wCSSF[bit 7] ← (wRd[word 1] ≠ (Temp1373 + Temp1384) ) |
    wCSSF[bit 7];
    wRd[word 0] ←saturate(Temp1351 + Temp1362, {US,SS}, 32);
    wCSSF[bit 3] ← (wRd[word 0] ≠ (Temp1351 + Temp1362) ) |
    wCSSF[bit 3];
}
```

For one alternative embodiment of the SIMD multiply and add operation, multiplication and addition can be performed together with signed, unsigned or no saturation.

Figure 14A:
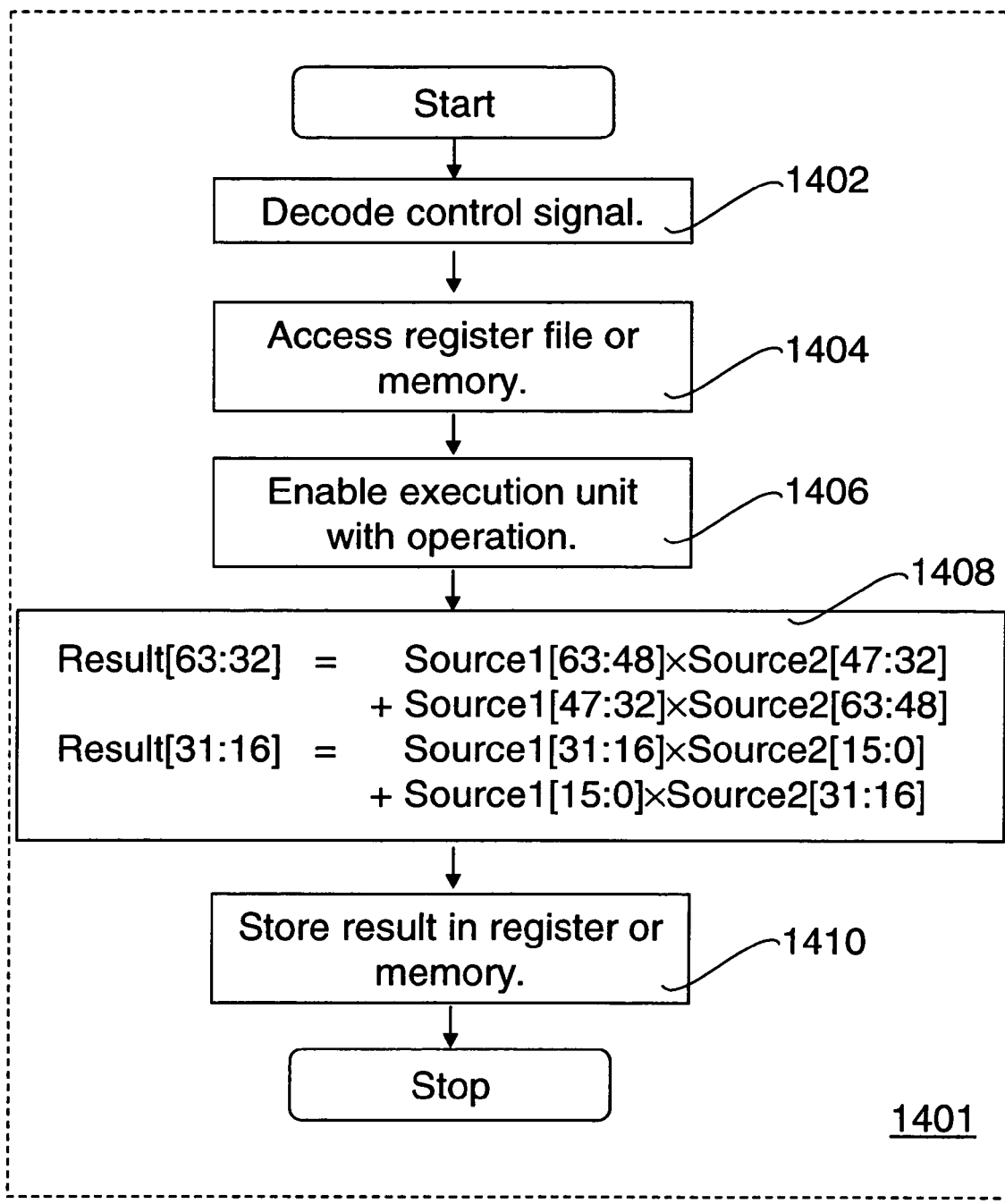
FIG. 14a illustrates a flow chart for one embodiment of a process to perform a SIMD multiply-add operation.

FIG. 14a illustrates a flow chart for one embodiment of a process 1401 to perform a SIMD cross-multiply and add operation. In processing block 1402 a coprocessor instruction is decoded identifying a SIMD cross-multiply and add operation. In processing block 1404 operands, Source1 and Source2, are accessed from a register file or from memory and processing flow proceeds to processing block 1406. In processing block 1406, an execution unit is enabled with the SIMD cross-multiply and add operation and processing flow proceeds to processing block 1408. In processing block 1408, the result data elements are computed as: Source1[63:48]×Source2[47:32]+Source1[47:32]×Source2[63:48] for Result[63:32], and Source1[31:16]×Source2[15:0]+Source1[15:0]×Source2[31:16] for Result[31:0]. Then in processing block 1410, the computed result is stored to the register file or memory and the process terminates.

Figure 14B:
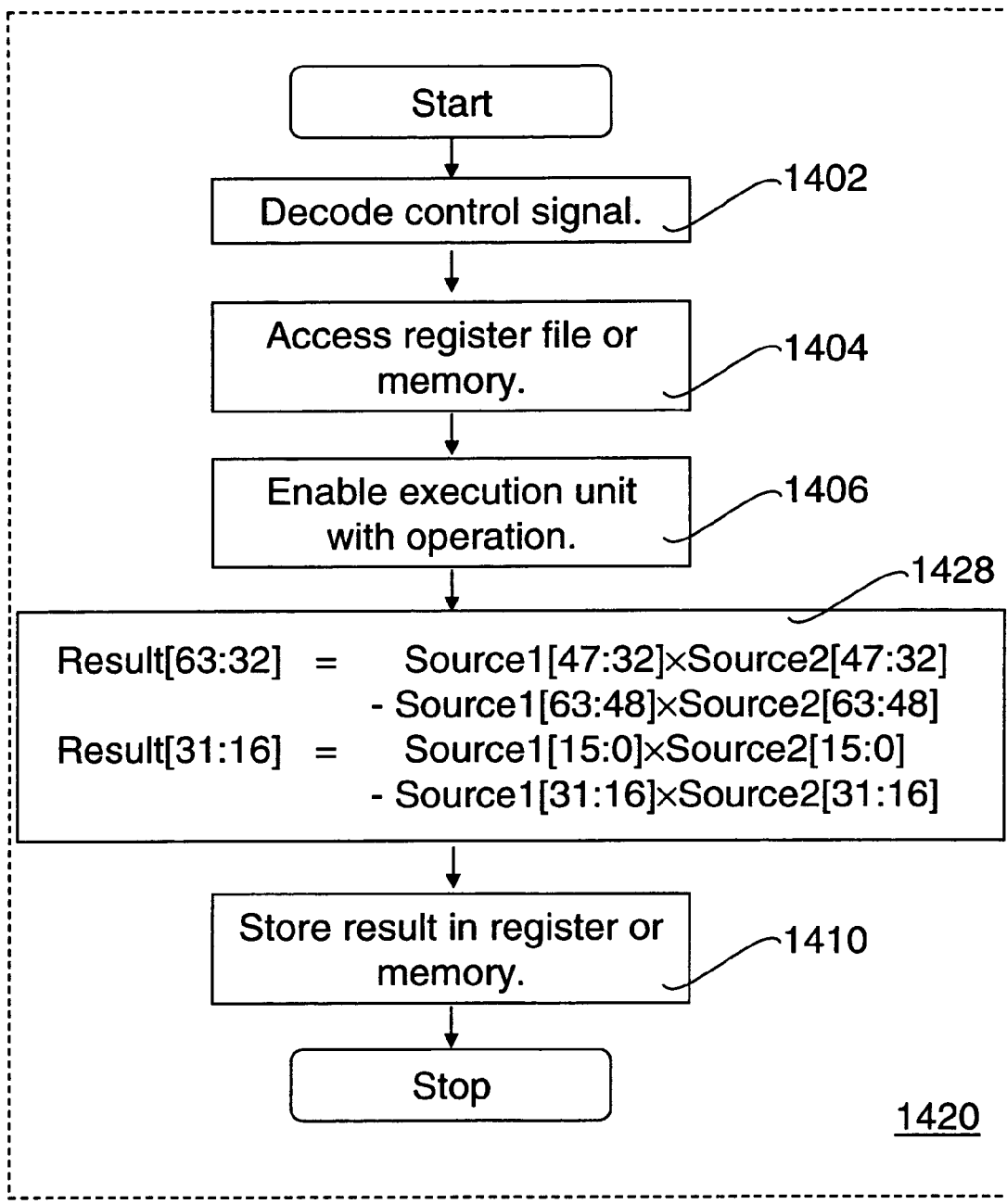
FIG. 14b illustrates a flow chart for one embodiment of a process to perform a SIMD multiply-subtract operation.

FIG. 14b illustrates a flow chart for one embodiment of a process 1420 to perform a SIMD multiply and subtract operation. In processing block 1402 a coprocessor instruction is decoded identifying a SIMD multiply and subtract operation. In processing block 1404 operands, Source1 and Source2, are accessed from a register file or from memory and processing flow proceeds to processing block 1406. In processing block 1406, an execution unit is enabled with the SIMD multiply and subtract operation and processing flow proceeds to processing block 1408. In processing block 1408, the result data elements are computed as: Source1[47:32]×Source2[47:32]−Source1[63:48]×Source2[63:48] for Result[63:32], and Source1[15:0]×Source2[15:0]+Source1[31:16]×Source2[31:16] for Result[31:0]. Then in processing block 1410, the computed result is stored to the register file or memory and the process terminates. For alternative embodiments of a multiply subtract operation a least significant product or a cross-product may be negated rather than a most significant product.

Figure 15:
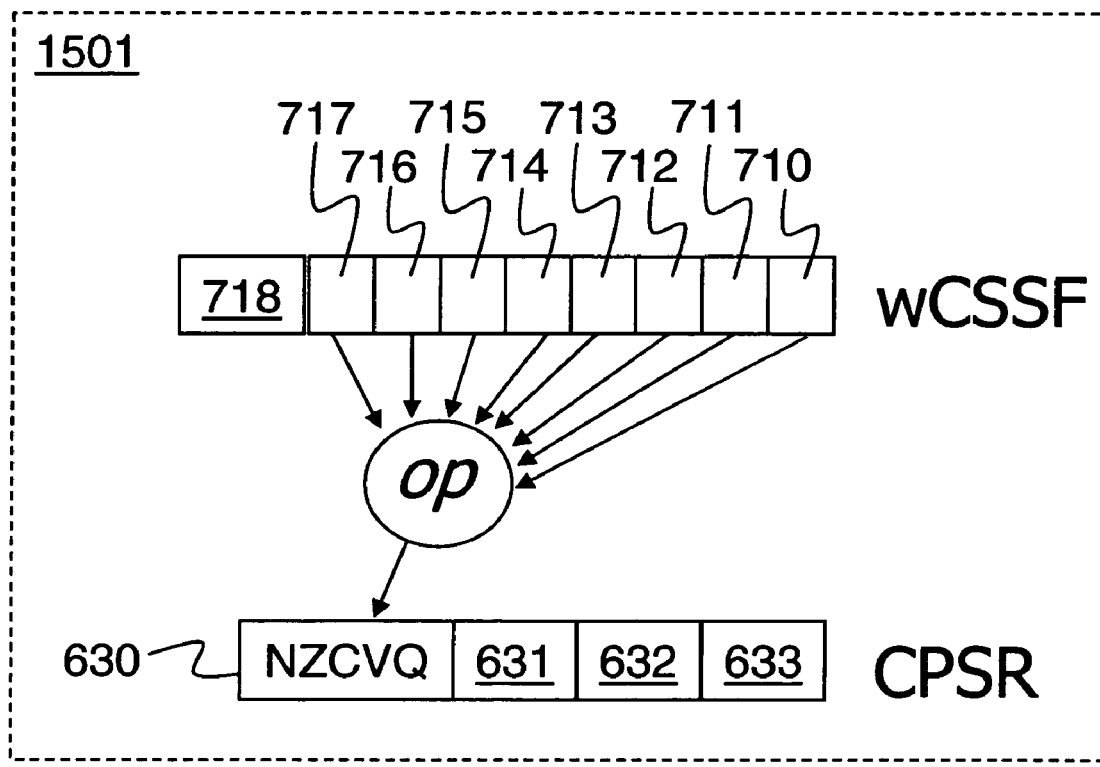
FIG. 15 illustrates one embodiment of an operation for processing SIMD saturation history.

FIG. 15 illustrates one embodiment of an operation 1501 for processing SIMD saturation history. The instruction for operation 1501 performs one or more operations (op) on data from SIMD fields 717-710 and stores a result in condition code flags set 630 of the CPSR. The result of operation 1501 may provide for conditional execution or group conditional execution of instructions based on saturation history.

For one embodiment of operation 1501 the data from all of the SIMD fields 717-710 is logically combined by an OR operation and the combined result is written to the overflow (V) flag in condition code flags set 630 of the CPSR. For an alternative embodiment of operation 1501 data is selected from one specific field of the SIMD fields 717-710 and written to the overflow (V) flag in condition code flags set 630 of the CPSR. For another alternative embodiment of operation 1501, data is written to the saturation (Q) flag in condition code flags set 630 of the CPSR. For another alternative embodiment of operation 1501, data from SIMD fields 717-710 is logically combined by an AND operation. For another alternative embodiment of operation 1501, data from SIMD fields 717-710 is counted and compared to a threshold value.

An operation encoding for one embodiment of operation 1501 may be summarized as shown in Table 10.

TABLE 10

| 31-28 | 27-24 | 23-21 | 20 | 19-16 | 15-12 | 11-8 | 7-5 | 4 | 3-0 |
|---|---|---|---|---|---|---|---|---|---|
| Cond | 1110 | ww0 | 1 | 0011 | 1111 | 0001 | 010 | 1 | 0000 |

For one embodiment of operation 1501, the values in bit positions 23 and 22 select which SIMD fields 717-710 to use in performing said one or more operations (op). For example: SIMD fields 717 and 713 (word saturation history) may be selected by a value of 10, SIMD fields 717 715, 713 and 711 (half word saturation history) may be selected by a value of 01, and all SIMD fields 717-710 (byte saturation history) may be selected by a value of 00.

For one embodiment of operation 1501, one or more operations can be performed on data selected from SIMD fields 717-710 and results may be stored in condition code flags set 630 of the CPSR as shown below.

```
If (byte history is specified) then {
    CPSR[bits 31-29] ← 000;
    CPSR[bit 28] ← wCSSF[bit 7] | wCSSF[bit 6] |
    wCSSF[bit 5] | wCSSF[bit 4] | wCSSF[bit 3] |
    wCSSF[bit 2] | wCSSF[bit 1] | wCSSF[bit 0];
}
If (half word history is specified) then {
    CPSR[bits 31-29] ← 000;
    CPSR[bit 28] ← wCSSF[bit 7] | wCSSF[bit 5] |
    wCSSF[bit 3] | wCSSF[bit 1];
}
Else if (word history is specified) then {
    CPSR[bits 31-29] ← 000;
    CPSR[bit 28] ← wCSSF[bit 7] | wCSSF[bit 3];
}
```

It will be appreciated that the above illustrated operations, encodings and formats may be modified in arrangement and detail by those skilled in the art without departing from the principles herein disclosed and claimed.

Figure 16:
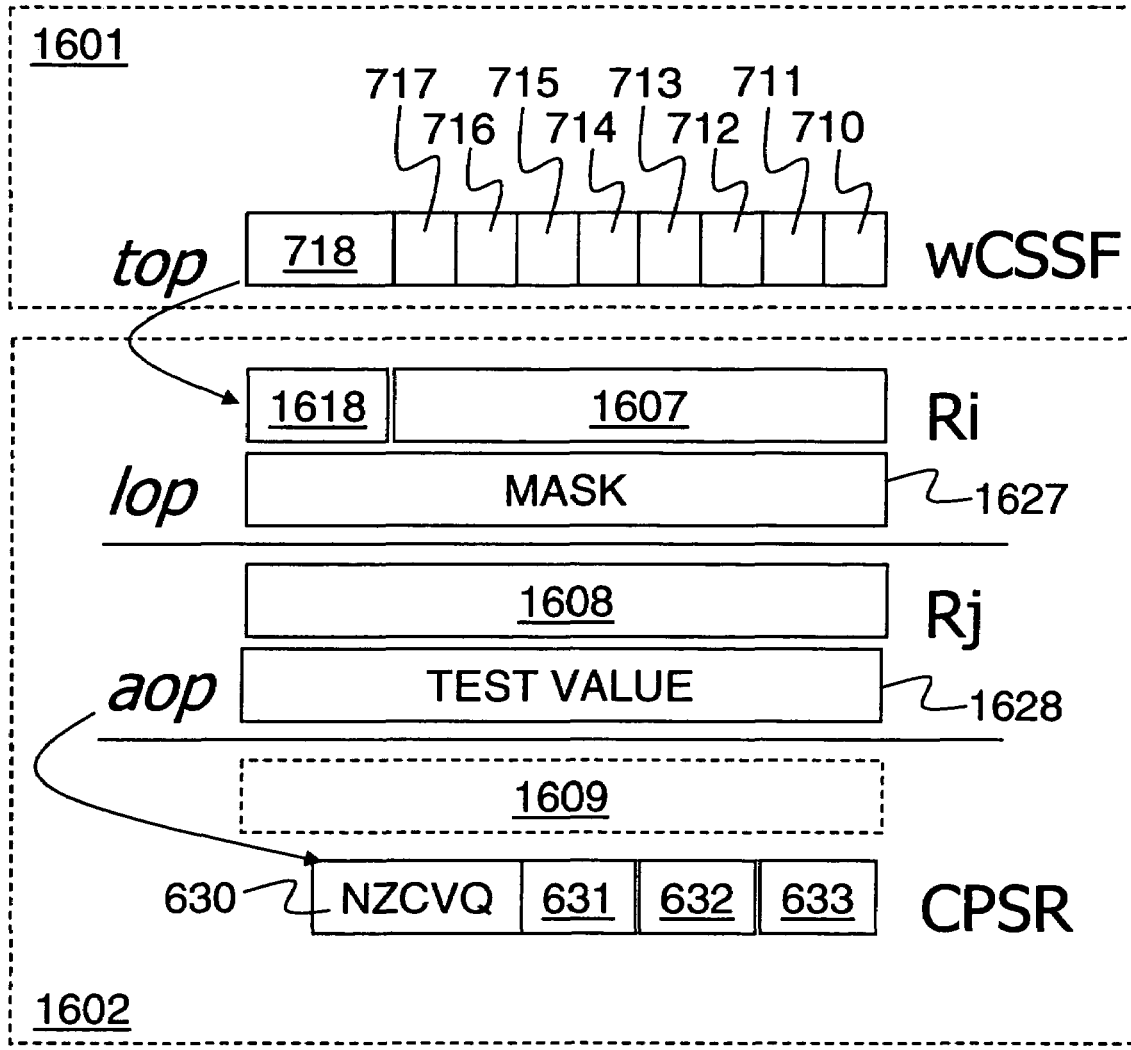
FIG. 16 illustrates one alternative embodiment of a sequence of operations for processing SIMD saturation history.

FIG. 16 illustrates one alternative embodiment of a sequence of operations 1601 and 1602 for processing SIMD saturation history. Operation 1601 comprises a transfer operation (top) to move data form one or more SIMD fields 717-710 to a field 1607 in register Ri. Operation 1602 comprises an arithmetic/logical operation (aop) to process SIMD saturation history data and to store a result in condition code flags set 630 of the CPSR. For one embodiment of operation 1602, arithmetic/logical operation (aop) performs a comparison of the SIMD saturation history data with a test value 1628. For an alternative embodiment of operation 1602, arithmetic/logical operation (aop) performs a subtraction of test value 1628 from the SIMD saturation history data. For one embodiment of operation 1602, arithmetic/logical operation (aop) also stores a result in register 1609. For one embodiment of operation 1602, SIMD saturation history data 1608 in register Rj comprises the data of field 1607 in register Ri. For one embodiment of operation 1602, register Rj is register Ri.

For one embodiment of operation 1601, data from reserved field 718 is transferred to field 1618 in register Ri. One alternative embodiment of operation 1602 further comprises logical operation (lop) to process SIMD saturation history data from the one or more SIMD fields 717-710 with mask 1627 and to store SIMD saturation history data 1608 in register Rj as an input operand for arithmetic/logical operation (aop).

Figure 17:
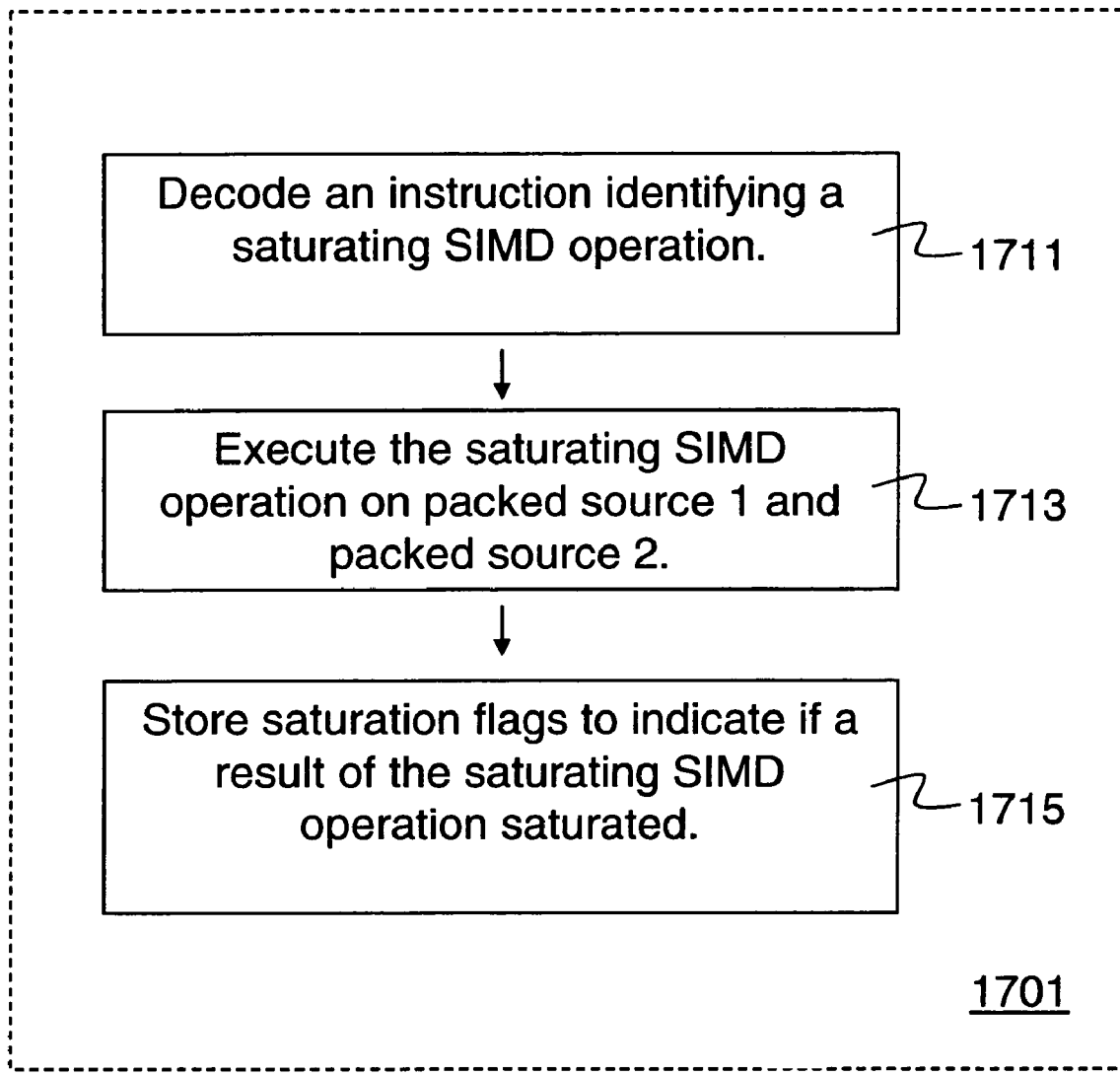
FIG. 17 illustrates a flow diagram for one embodiment of a process to generate and store SIMD saturation history.

It will be appreciated that for various embodiments of operation 1602, multiple various flags of condition code flags set 630 may be affected in the CPSR FIG. 17 illustrates a flow diagram for one embodiment of a process to generate and store SIMD saturation history. Process 1701 and other processes herein disclosed are performed by processing blocks that may comprise dedicated hardware or software or firmware operation codes executable by general purpose machines or by special purpose machines or by a combination of both.

In processing block 1711 a coprocessor instruction is decoded identifying a saturating SIMD operation. Processing continues in processing block 1713 where the saturating SIMD operation is executed on a packed source 1 and a packed source 2. Processing continues in processing block 1715 where saturation flags are stored to indicate if a result of the saturating SIMD operation saturated.

Figure 18:
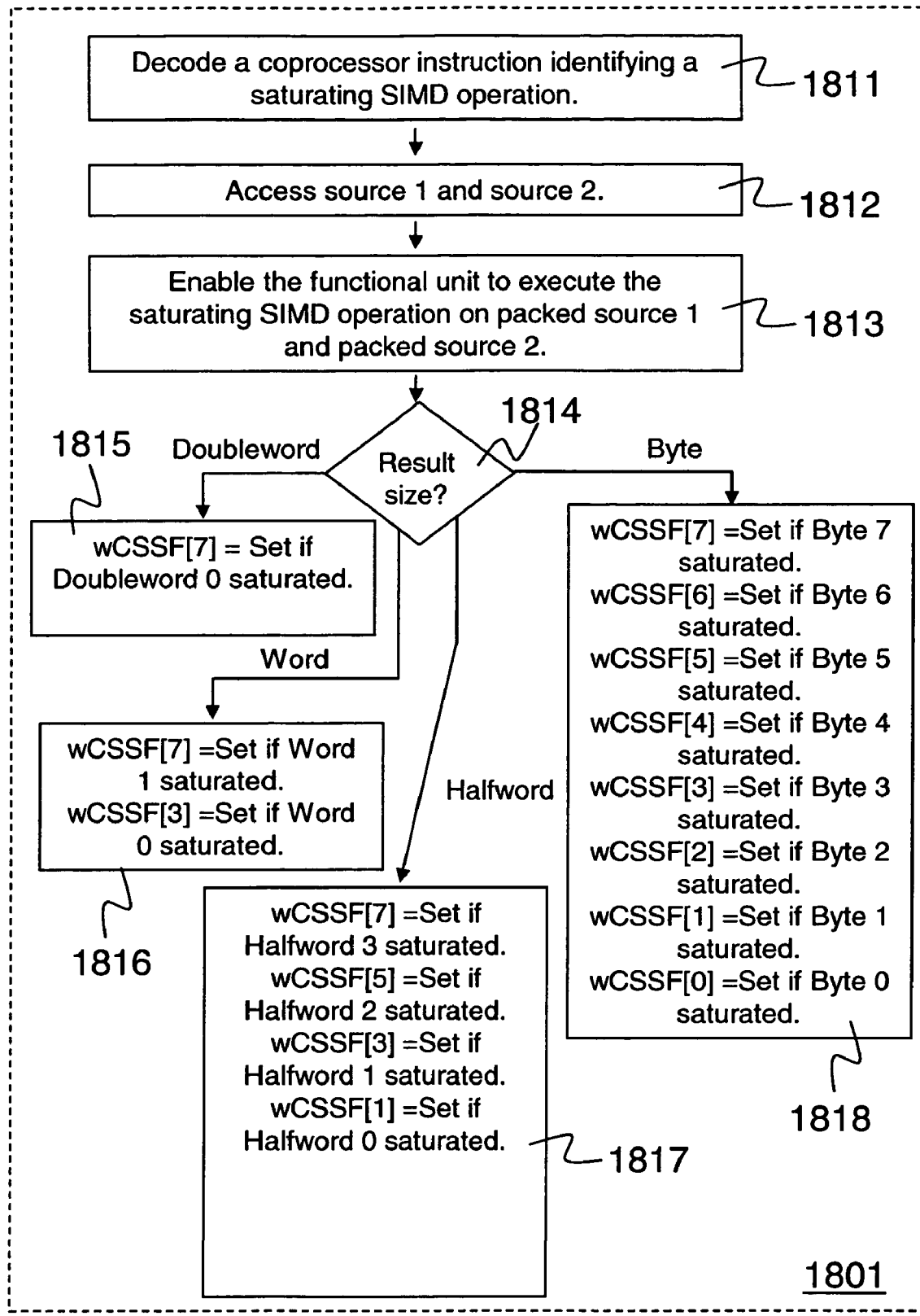
FIG. 18 illustrates a flow diagram for an alternative embodiment of a process to generate and store SIMD saturation history.

FIG. 18 illustrates a flow diagram for an alternative embodiment of a process to generate and store SIMD saturation history. In processing block 1811 a coprocessor instruction is decoded identifying a saturating SIMD operation. Processing continues in processing block 1812 where a source 1 and a source 2 are accessed. Processing continues in processing block 1813 where the functional unit is enabled to execute the saturating SIMD operation on packed data of source 1 and packed data of source 2. Processing continues in processing block 1814 where the size of the result data is identified.

If the result data are double words then processing continues in processing block 1815 where wCSSF[7] is set if the double word 0 result of the saturating SIMD operation saturated. If the result data are words then processing continues in processing block 1816 where wCSSF[7] is set if the word 1 result of the saturating SIMD operation saturated and wCSSF[3] is set if the word 0 result of the saturating SIMD operation saturated. If the result data are half words then processing continues in processing block 1817 where wCSSF[7] is set if the half word 3 result of the saturating SIMD operation saturated, wCSSF[5] is set if the half word 2 result of the saturating SIMD operation saturated, wCSSF[3] is set if the half word 1 result of the saturating SIMD operation saturated and wCSSF[1] is set if the half word 0 result of the saturating SIMD operation saturated. If the result data are bytes then processing continues in processing block 1818 where wCSSF[7] is set if the byte 7 result of the saturating SIMD operation saturated, wCSSF[6] is set if the byte 6 result saturated, wCSSF[5] is set if the byte 5 result saturated, wCSSF[4] is set if the byte 4 result saturated, wCSSF[3] is set if the byte 3 result saturated, wCSSF[2] is set if the byte 2 result saturated, wCSSF[1] is set if the byte 1 result saturated and wCSSF[0] is set if the byte 0 result of the saturating SIMD operation saturated.

It will be appreciated that process 1801 may store saturation history to other locations and/or to different sized fields without departing from the spirit of process 1801. It will also be appreciated that individual or combined SIMD saturation history may be used for conditional execution of subsequent instructions or of operations of subsequent instructions. It will also be appreciated that individual or combined SIMD saturation history may also be used for conditional selection and/or storage of data by subsequent instructions.

Figures 19A, 19B:
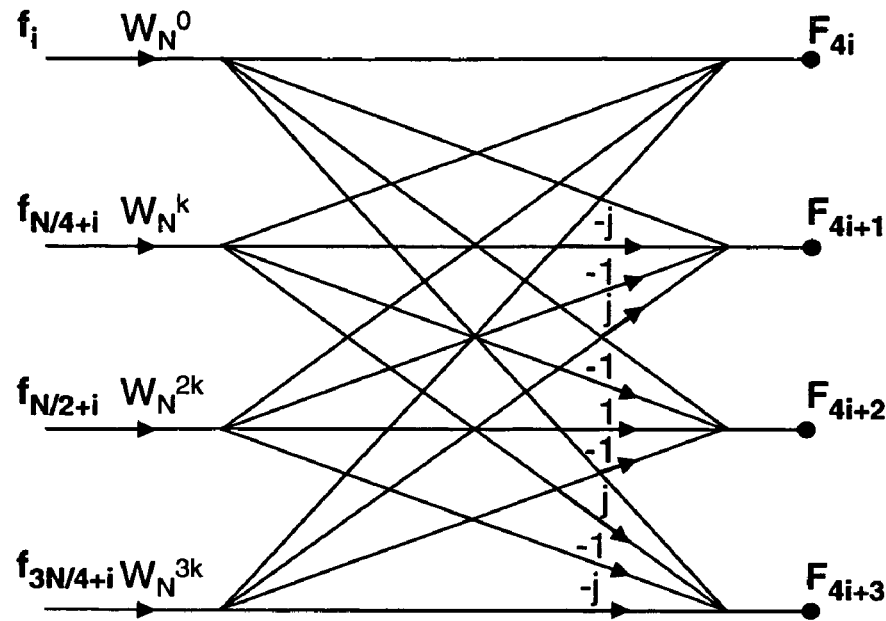
FIG. 19a illustrates an example of a radix-4 decimation in time operation of a Fast-Fourier Transform (FFT).
FIG. 19b illustrates an equivalent of the radix-4 butterfly for a Fast-Fourier Transform (FFT) in matrix operations.

FIG. 19a illustrates an example of a radix-4 decimation in time operation of a Fast-Fourier Transform (FFT). The computations at each stage are called butterflies. In general, a radix-4 butterfly involves 3 complex multiplications (since $W_N^0=1$) and 12 complex additions.

The FFT is an implementation of the Discrete Fourier Transform (DFT), $$X[k] = (1/N) \sum_{n=0}^{N-1} x[n] W_N^{kn}, \quad 0 \le k \le N-1$$

$$W_N^k = e^{-j2\pi k/N}$$
$$= \cos(2\pi k/N) + j\sin(2\pi k/N)$$

where the twiddle factors, $W_N^k$, have been simplified to reduce the required number of multiplications. Since complex multiplications are typically computationally expensive, a significant reduction in the number of multiplications results in a significantly faster algorithm.

FIG. 19b illustrates an equivalent of the radix-4 butterfly for a Fast-Fourier Transform (FFT) in matrix operations. Product 1950 represents the multiplication of the complex inputs 1940 by the complex twiddle factors 1930 as seen on the left hand side of the radix-4 butterfly illustrated in FIG. 19a. Transformation matrix 1920 selectively reorders and negates the complex product components to produce the output vector 1910 for a particular butterfly stage.

It will be appreciated that the selective reordering and negation of complex SIMD components represents a significant computational overhead in complex multiplications and transformations such as those performed in the radix-4 FFT butterfly. Therefore a set of SIMD complex arithmetic operations that can accomplish the necessary reordering and negation of complex SIMD components without additional overhead may significantly improve performance for complex arithmetic.

FIG. 20a illustrates one embodiment of a process to perform a SIMD multiply and subtract operation to generate real components for a complex multiplication. The figure illustrates the imaginary and real components of two complex inputs $f_{N/2}$ and $f_{N/2+1}$ being stored in a naturally interleaved order as operand wRn. These components are multiplied with the imaginary and real components of $W_N^{2k}$ according to an embodiment of the multiply and subtract operation as illustrated in FIGS. 13c and 14b to concurrently generate the real product components of two complex multiplications. It will be appreciated that in accordance with the multiply and subtract operation the imaginary components, $X_0$ and $X_1$ are each multiplied by the imaginary component W to generate the products $WX_0$ and $WX_1$ and the real components $x_0$ and $x_1$ are each multiplied by the real component w to generate the products $wx_0$ and $wx_1$. The products of the imaginary components are then subtracted from the products of the real components to produce in wRd the real components (wx$_0$ minus WX$_0$, and wx$_1$ minus WX$_1$) of two complex multiplications.

FIG. 20b illustrates one embodiment of a process to perform a SIMD cross multiply and add operation to generate imaginary components for a complex multiplication. This figure again illustrates the imaginary and real components of two complex inputs f$_{N/2}$ and f$_{N/2+1}$ being stored in a naturally interleaved order as operand wRn. These components are multiplied with the real and imaginary components of W$_N^{2k}$ according to an embodiment of the cross multiply and add operation as illustrated in FIGS. 13b and 14a to concurrently generate the imaginary product components of two complex multiplications. It will be appreciated that in accordance with the cross multiply and add operation the imaginary components, X$_0$ and X$_1$ are each multiplied by the real component w to generate the products wX$_0$ and wX$_1$ and the real components x$_0$ and x$_1$ are each multiplied by the imaginary component W to generate the products Wx$_0$ and Wx$_1$. The products of the real-times-imaginary components are then added to the products of the imaginary-times-real components to produce in wRd the imaginary components (Wx$_0$ plus wX$_0$, and Wx$_1$ plus wX$_1$) of two complex multiplications.

It will be appreciated that while the examples provided in FIGS. 20a and 20b show multiplications of two complex inputs by the same complex twiddle factor consistent with a computation of two parallel butterfly stages, the invention is not so limited and that two parallel complex multiplications involving multipliers and multiplicands of any sort may be similarly performed.

Figure 21:
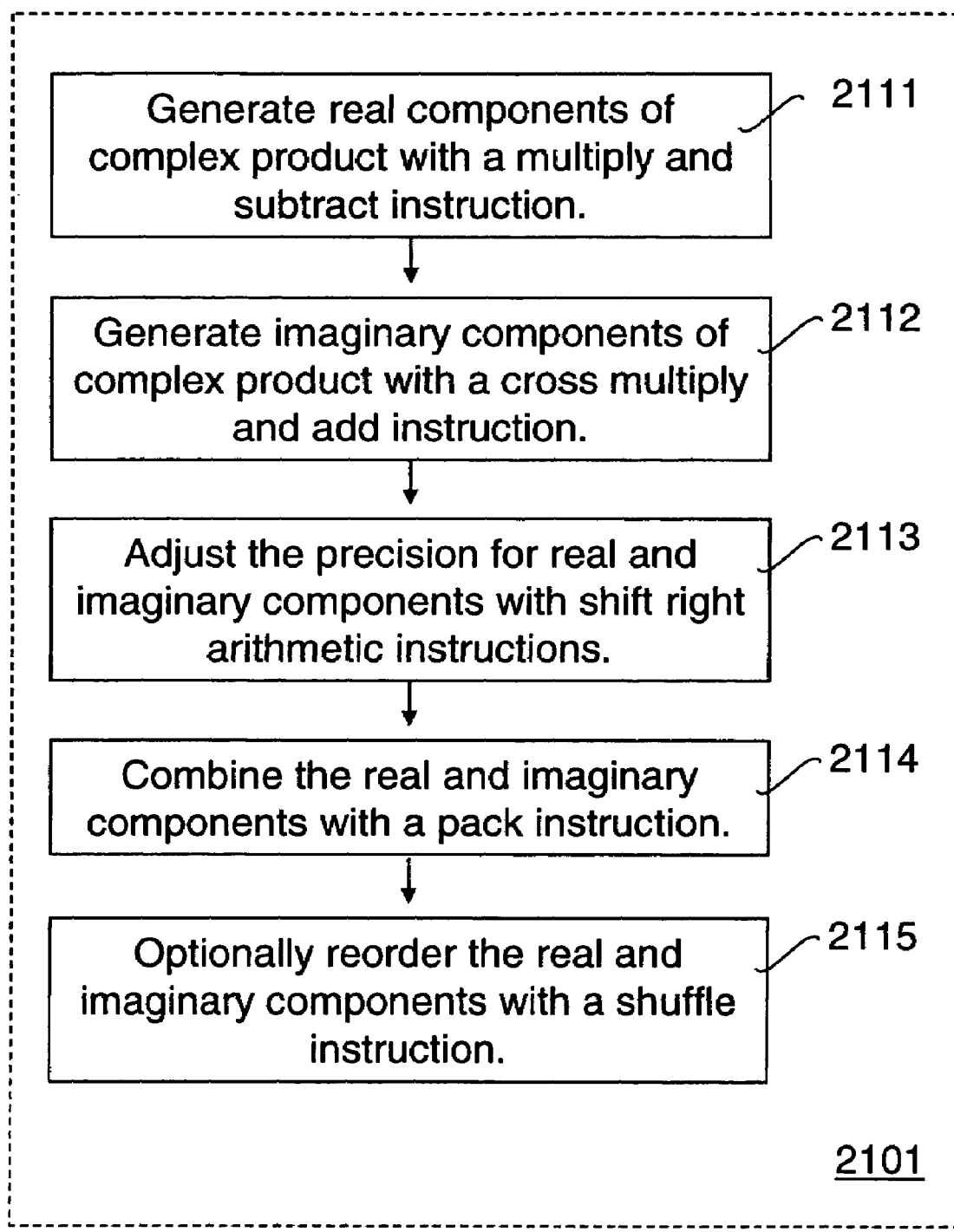
FIG. 21 illustrates a flow chart for one embodiment of a process to perform SIMD complex arithmetic operations to generate product components for a complex multiplication.

FIG. 21 illustrates a flow chart for one embodiment of a process 2101 to perform SIMD complex arithmetic operations to generate product components for a complex multiplication. In processing block 2111 a SIMD multiply and subtract instruction, for example as shown in FIG. 13c, is used to generate real components for a complex multiplication. In processing block 2112 a SIMD cross multiply and add instruction, for example as shown in FIG. 13b, is used to generate imaginary components for a complex multiplication and processing flow proceeds to processing block 2113. In processing block 2113, the precision of the real and of the imaginary components is adjusted using SIMD shift right arithmetic instructions, for example as shown in FIG. 9d, and processing flow proceeds to processing block 2114. In processing block 2114, the real and imaginary components are combined using a SIMD pack instruction, for example as shown in FIG. 9a. Then in processing block 2115, real and imaginary components are optionally reordered using a SIMD shuffle instruction, for example as shown in FIG. 9e.

FIG. 22a-h illustrate embodiments of processes to perform SIMD addition subtraction, add-subtract and subtract-add operations to transform product components for a radix-4 FFT, for example to accomplish a transformation similar to the one illustrated by transformation matrix 1920.

FIGS. 22a and 22b illustrate embodiments of processes to perform SIMD additions to combine real and imaginary components of elements f$_i$W$_N^0$ and f$_{N/2+i}$W$_N^{2k}$ into a first set of sums and to combine real and imaginary components of elements f$_{N/4+i}$W$_N^k$ and f$_{3N/4+i}$W$_N^{3k}$ into a second set of sums. These figures each illustrate the imaginary and real components of two complex inputs, for example f$_0$W$_N^0$ and f$_1$W$_N^0$ or f$_{N/4}$W$_N^k$ and f$_{N/4+1}$W$_N^k$, being stored in a naturally interleaved order as operand wRn and the imaginary and real components of two complex inputs, for example f$_{N/2}$W$_N^{2k}$ and f$_{N/2+1}$W$_N^{2k}$ or f$_{3N/4}$W$_N^{3k}$ and f$_{3N/4+1}$W$_N^{3k}$, being stored in a naturally interleaved order as operand wRm. These real and imaginary components are added with the corresponding real and imaginary components to concurrently generate the first and second sets of sums in wRd.

FIGS. 22c and 22d illustrate embodiments of processes to perform SIMD subtractions to combine real and imaginary components of elements f$_i$W$_N^0$ and f$_{N/2+i}$W$_N^{2k}$ into a first set of differences and to combine real and imaginary components of elements f$_{N/4+i}$W$_N^k$ and f$_{3N/4+i}$W$_N^{3k}$ into a second set of differences. These figures each illustrate the imaginary and real components of two complex inputs, for example f$_0$W$_N^0$ and f$_1$W$_N^0$ or f$_{N/4}$W$_N^k$ and f$_{N/4+1}$W$_N^k$, being stored in a naturally interleaved order as operand wRn and the imaginary and real components of two complex inputs, for example f$^{N/2}$W$_N^{2k}$ and f$_{N/2+1}$W$_N^{2k}$ or f$_{3N/4}$W$_N^{3k}$ and f$_{3N/4+1}$W$_N^{3k}$, being stored in a naturally interleaved order as operand wRm. These real and imaginary components are subtracted from corresponding real and imaginary components to concurrently generate the first and second sets of differences in wRd.

FIG. 22e illustrates an embodiment of a process to perform a SIMD addition operation to generate complex components for a radix-4 butterfly stage output F$_{4i}$ by adding the real and imaginary components of the first and second sets of sums of FIGS. 22a and 22b.

FIG. 22f illustrates an embodiment of a process to perform a SIMD subtraction operation to generate complex components for a radix-4 butterfly stage output F$_{4i+2}$ by subtracting the real and imaginary components of second set of sums of FIG. 22b from the first set of sums of FIG. 22a.

FIG. 22g illustrates an embodiment of a process to perform a SIMD add-subtract operation to generate complex components for a radix-4 butterfly stage output F$_{4i+1}$ from the first and second set of differences of FIGS. 22c and 22d. The real components of the first set of differences are added to the imaginary components of the second set of differences and the real components of the second set of differences are subtracted from the imaginary components of the first set of differences according to an embodiment of the add-subtract operation as illustrated in FIGS. 10b and 12.

FIG. 22h illustrates an embodiment of a process to perform a SIMD subtract-add operation to generate complex components for a radix-4 butterfly stage output F$_{4i+3}$ from the first and second set of differences of FIGS. 22c and 22d. The real components of the second set of differences are subtracted from the imaginary components of the first set of differences and the real components of the first set of differences are added to the imaginary components of the second set of differences according to an embodiment of the subtract-add operation as illustrated in FIGS. 10a and 11.

Figure 23:
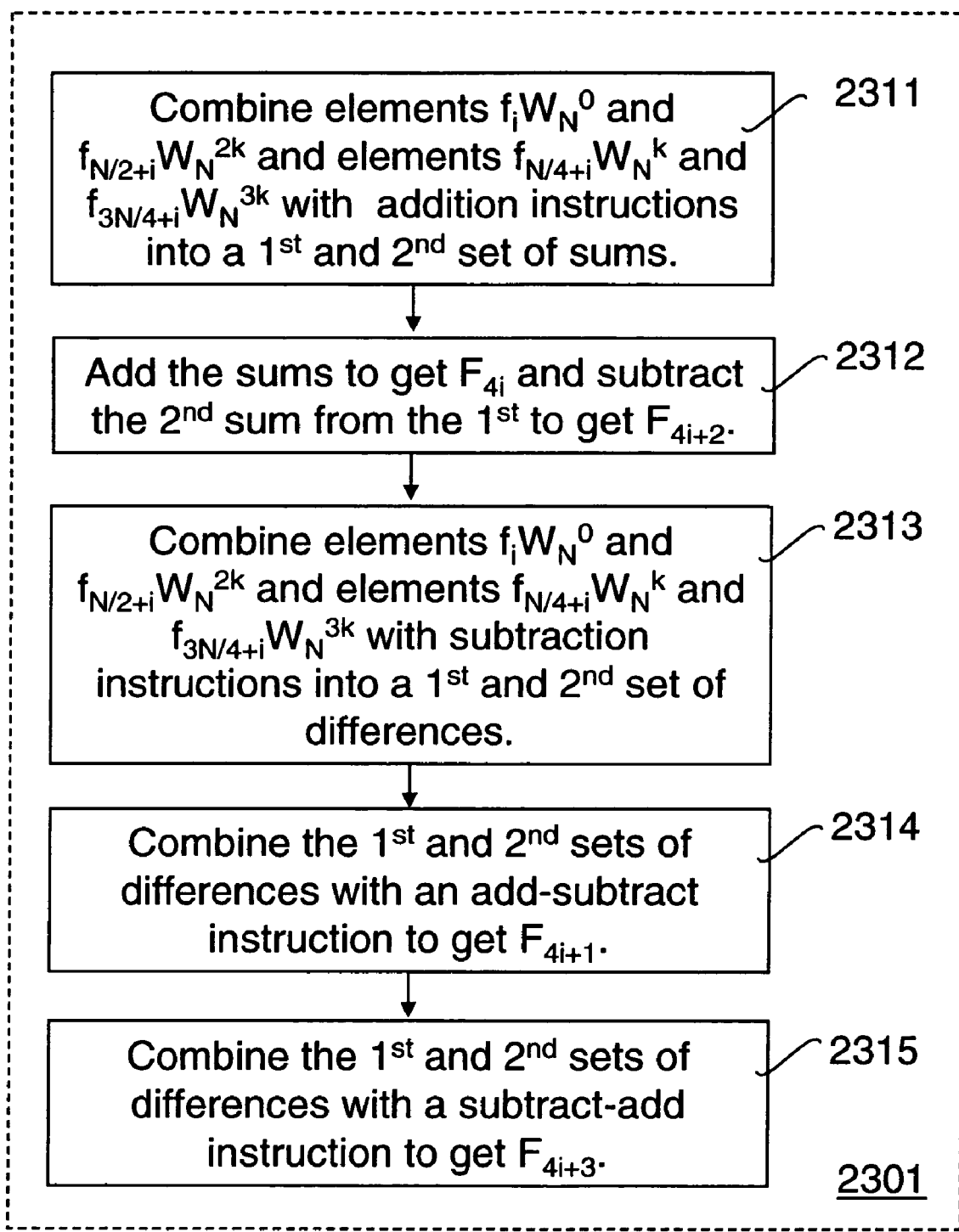
FIG. 23 illustrates a flow chart for one embodiment of a process to perform SIMD addition subtraction, add-subtract and subtract-add operations to transform product components for a radix-4 Fast-Fourier Transform (FFT).

FIG. 23 illustrates a flow chart for one embodiment of a process 2301 to perform SIMD addition subtraction, add-subtract and subtract-add operations to transform product components for a radix-4 FFT. In processing block 2311, SIMD additions, for example as shown in FIG. 9b, are used to combine real and imaginary components of elements f$_i$W$_N^0$ and f$_{N/2+i}$W$_N^{2k}$ into a first set of sums and to combine real and imaginary components of elements f$_{N/4+i}$W$_N^k$ and f$^{3N/4+i}$W$_N^{3k}$ into a second set of sums. In processing block 2312 another SIMD addition operation is used to generate complex components for a radix-4 butterfly stage output F$_{4i}$ by adding the real and imaginary components of the first and second sets of sums, and a SIMD subtraction, for example as shown in FIG. 9c, is used to generate complex components for a radix-4 butterfly stage output F$_{4i+2}$ by subtracting the real and imaginary components of second sets of sums from the real and imaginary components of first set of sums. Processing flow continues in processing block 2313, where SIMD subtractions are used to combine real and imaginary components of elements $f_i W_N^0$ and $f_{N/2+i} W_N^{2k}$ into a first set of differences and to combine real and imaginary components of elements $f_{N/4+i} W_N^k$ and $f_{3N/4+i} W_N^{3k}$ into a second set of differences. In processing block 2314, a SIMD add-subtract instruction, for example as shown in FIG. 10b, is used to generate complex components for a radix-4 butterfly stage output $F_{4i+1}$ from the first and second set of differences. Then in processing block 2315, a SIMD subtract-add instruction, for example as shown in FIG. 10a, is used to generate complex components for a radix-4 butterfly stage output $F_{4i+3}$ from the first and second set of differences.

Figure 24A:
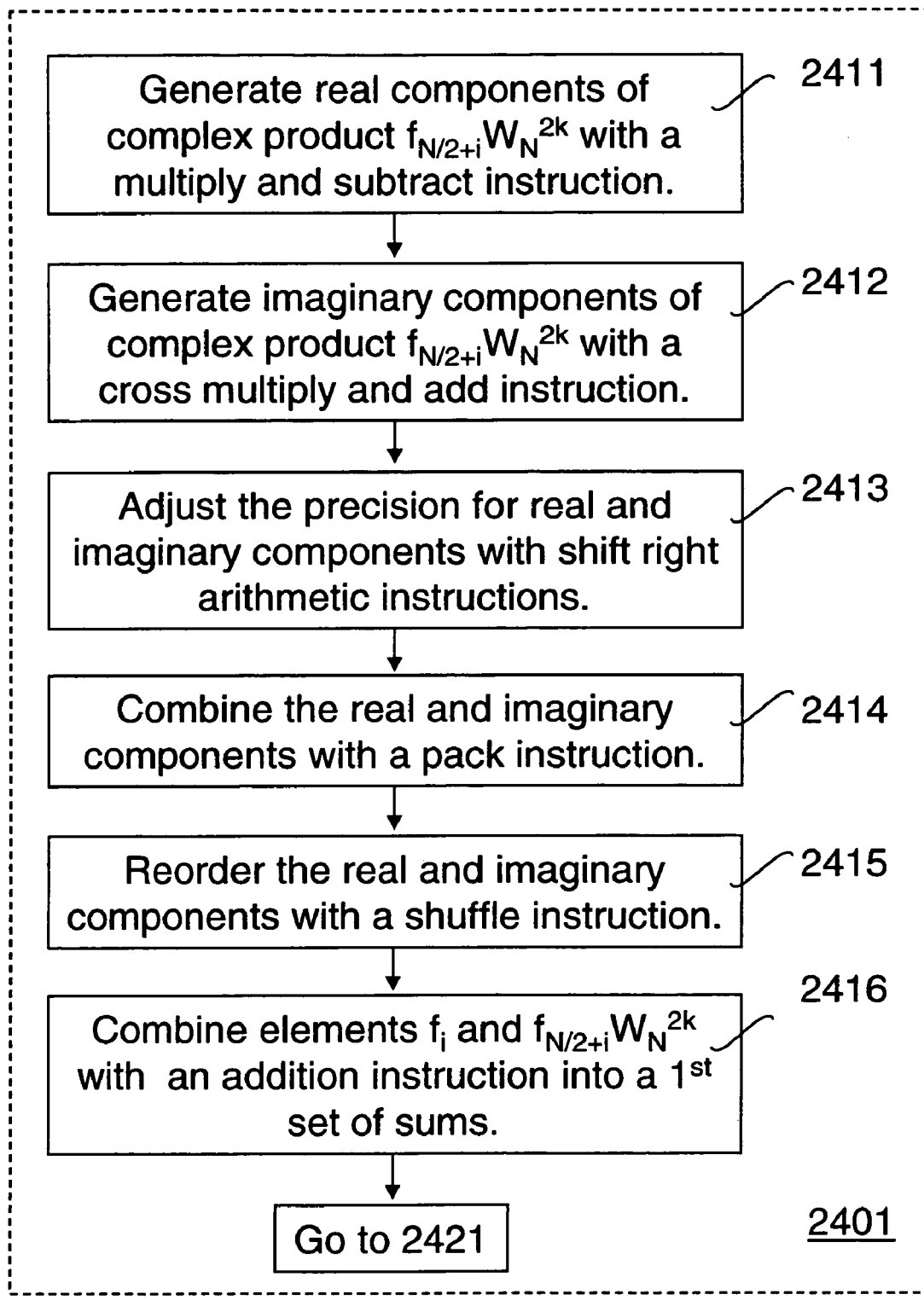
FIG. 24a-d illustrates a flow chart for one embodiment of a process to perform SIMD complex arithmetic operations for a radix-4 Fast-Fourier Transform (FFT).

FIG. 24a-d illustrates a flow chart for one embodiment of a process to perform SIMD complex arithmetic operations for a radix-4 FFT. Turning first to FIG. 24a, in processing block 2411 a SIMD multiply and subtract instruction, for example as shown in FIG. 13c, is used to generate real components for a complex multiplication of $f_{N/2+i}$ by $W_N^{2k}$. In processing block 2412 a SIMD cross multiply and add instruction, for example as shown in FIG. 13b, is used to generate imaginary components for a complex multiplication of $f_{N/2+i}$ by $W_N^{2k}$ and processing flow proceeds to processing block 2413. In processing block 2413, the precision of the real and of the imaginary components is adjusted using SIMD shift right arithmetic instructions, for example as shown in FIG. 9d, and processing flow proceeds to processing block 2414. In processing block 2414, the real and imaginary components are combined using a SIMD pack instruction, for example as shown in FIG. 9a. Then in processing block 2415, real and imaginary components are reordered using a SIMD shuffle instruction, for example as shown in FIG. 9e, and processing flow proceeds to processing block 2416. In processing block 2416, a SIMD addition instruction, for example as shown in FIG. 9b, is used to combine real and imaginary components of elements $f_i$ and $f_{N/2+i} W_N^{2k}$ into a first set of sums.

Figure 24B:
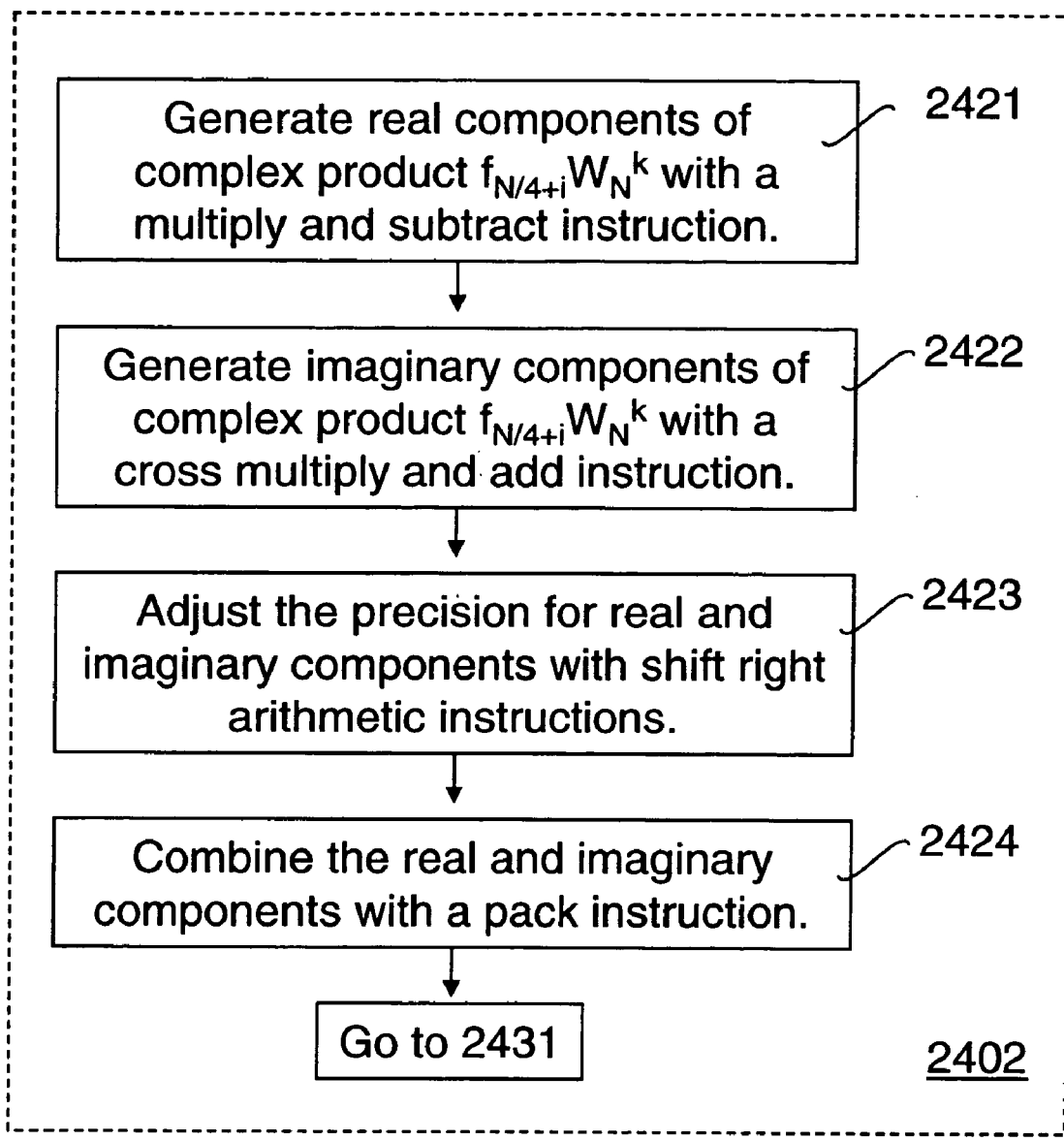

Turning next to FIG. 24b, processing flow continues in processing block 2421 where another SIMD multiply and subtract instruction is used to generate real components for a complex multiplication of $f_{N/4+i}$ by $W_N^k$. In processing block 2422 a SIMD cross multiply and add instruction is used to generate imaginary components for a complex multiplication of $f_{N/4+i}$ by $W_N^k$ and processing flow proceeds to processing block 2423. In processing block 2423, the precision of the real and of the imaginary components is adjusted using SIMD shift right arithmetic instructions and processing flow proceeds to processing block 2424. In processing block 2414, the real and imaginary components are combined using a SIMD pack instruction.

Figure 24C:
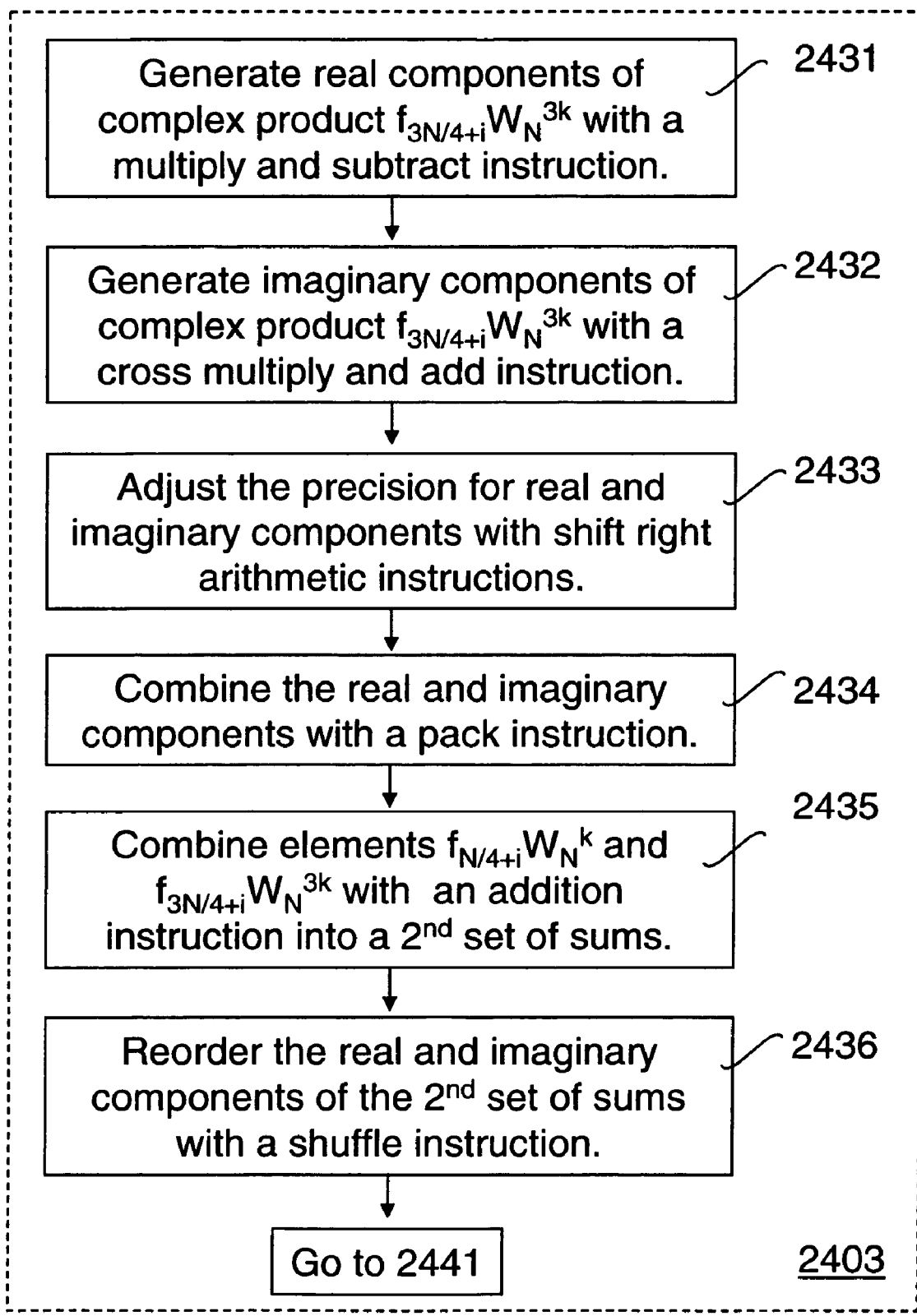
Figure 24D:
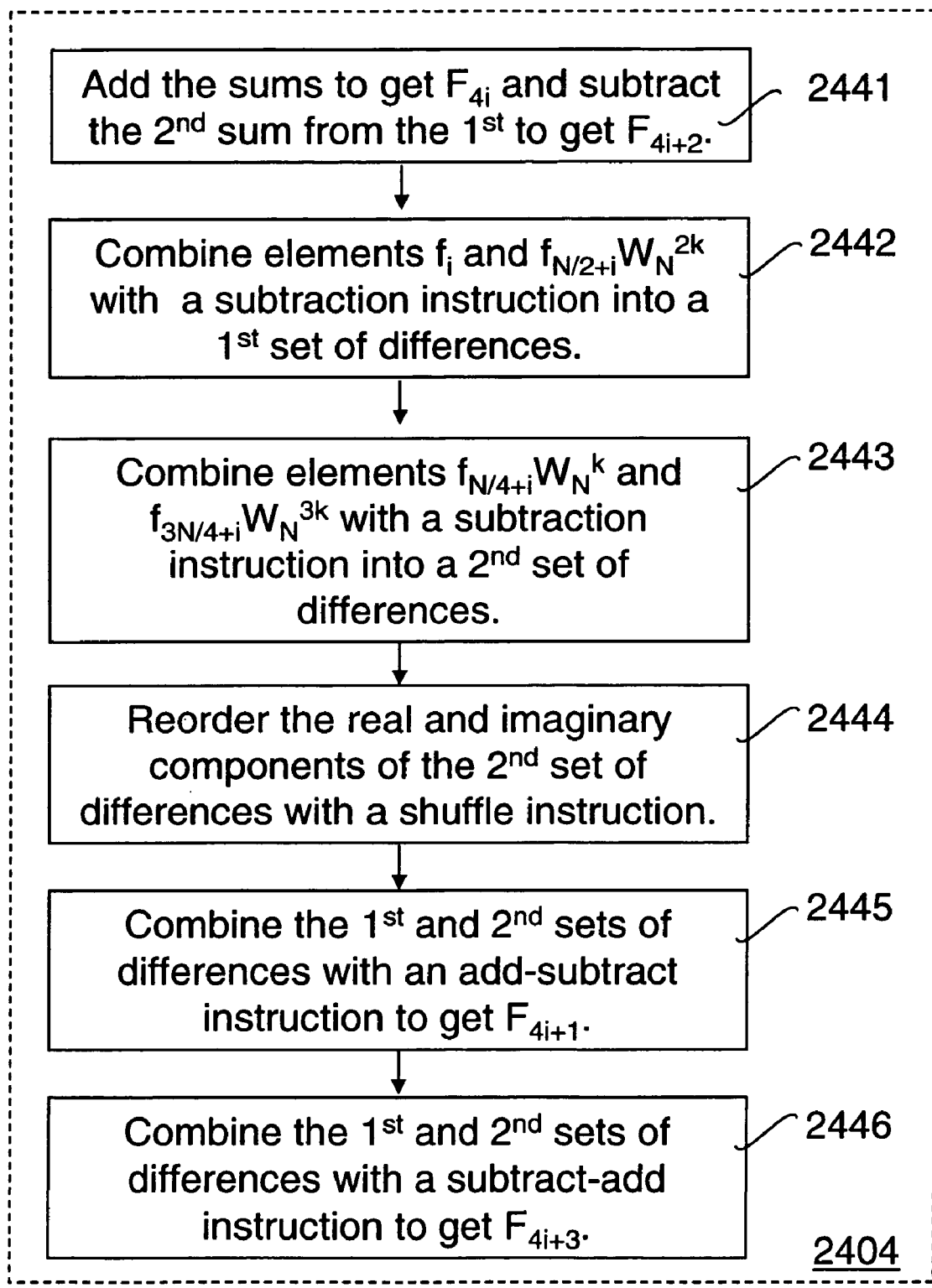

Turning next to FIG. 24c, processing flow continues in processing block 2431 where another SIMD multiply and subtract instruction is used to generate real components for a complex multiplication of $f_{3N/4+i}$ by $W_N^{3k}$. In processing block 2432 a SIMD cross multiply and add instruction is used to generate imaginary components for a complex multiplication of $f_{3N/4+i}$ by $W_N^{3k}$ and processing flow proceeds to processing block 2433. In processing block 2433, the precision of the real and of the imaginary components is adjusted using SIMD shift right arithmetic instructions and processing flow proceeds to processing block 2434. In processing block 2434, the real and imaginary components are combined using a SIMD pack instruction. Processing flow continues in processing block 2435, where a SIMD addition instruction is used to combine real and imaginary components of elements $f_{N/4+i} W_N^k$ and $f_{3N/4+i} W_N^{3k}$ into a second set of sums. Then in processing block 2436, real and imaginary components of the second set of sums are reordered using a SIMD shuffle instruction and processing flow proceeds to processing block 2441.

Turning next to FIG. 24c, processing block 2441, a SIMD addition instruction is used to generate complex components for a radix-4 butterfly stage output $F_{4i}$ by adding the real and imaginary components of the first and second sets of sums, and a SIMD subtraction instruction is used to generate complex components for output $F_{4i+2}$ by subtracting the real and imaginary components of second sets of sums from the real and imaginary components of first set of sums. In processing block 2442, a SIMD subtraction instruction is used to combine real and imaginary components of elements $f_i$ and $f_{N/2+i} W_N^{2k}$ into a first set of differences. Processing flow continues in processing block 2443, where another SIMD subtraction instruction is used to combine real and imaginary components of elements $f_{N/4+i} W_N^k$ and $f_{3N/4+i} W_N^{3k}$ into a second set of differences. Then in processing block 2444, real and imaginary components of the second set of differences are reordered using a SIMD shuffle instruction and processing flow proceeds to processing block 2445. In processing block 2445, a SIMD add-subtract instruction is used to generate complex components for the radix-4 butterfly stage output $F_{4i+1}$ from the first and second set of differences. Then in processing block 2446, a SIMD subtract-add instruction is used to generate complex components for the radix-4 butterfly stage output $F_{4i+3}$ from the first and second set of differences.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A computer-implemented method comprising:
   decoding a multiply and subtract instruction that specifies a first operand having first and second complex data elements and a second operand having third complex data elements corresponding to the first and second complex data elements, each of the first, second and third complex data elements having real and imaginary components;
   executing a multiply and subtract operation responsive to the multiply and subtract instruction to generate a first real component for a complex multiplication of the first complex data element and the corresponding third complex data element, and a second real component for a complex multiplication of the second complex data element and the corresponding third complex data element;
   decoding a cross multiply and add instruction that specifies the first operand and the second operand; and
   executing a cross multiply and add operation responsive to the cross multiply and add instruction to generate a first imaginary component for a complex multiplication of the first complex data element and the corresponding third complex data element, and a second imaginary component for a complex multiplication of the second complex data element and the corresponding third complex data element.

2. The method of claim 1 wherein decoding the multiply and subtract instruction includes identifying bit positions 23-22 of the instruction as each having a binary value of one and bit position 20 of the instruction having a binary value of zero.

3. The method of claim 1 wherein decoding the cross multiply and add instruction includes identifying bit position 22 of the instruction as having a binary value of zero and bit position 20 of the instruction as having a binary value of one.

4. An apparatus comprising:
a coprocessor interface unit to identify an instruction of a first instruction format for a cross multiply and add operation, a first source having a first ordered plurality of complex data elements including a first source first complex data element having a first source first real component and a first source first imaginary component and a first source second complex data element having a first source second real component and a first source second imaginary component, and a second source having a second ordered plurality of complex data elements corresponding to the first ordered plurality of complex data elements including a second source first complex data element having a second source first real component and a second source first imaginary component and a second source second complex data element that is the same as the second source first complex data element having a second source second real component and a second source second imaginary component; and
an execution unit to perform:
the cross multiply and add operation on the first source first complex data element and the second source first complex data element responsive to the instruction by adding the product of multiplying the first source first real component by the corresponding second source first imaginary component to the product of multiplying the first source first imaginary component by the corresponding second source first real component; and
the cross multiply and add operation on the first source second complex data element and the second source second complex data element responsive to the instruction by also adding the product of multiplying the first source second real component by the second source second imaginary component to the product of multiplying the first source second imaginary component by the second source second real component.

5. The apparatus of claim 4 wherein responsive to bit 21 of the first instruction format having a binary value of one and bit positions 7-5 each having a binary value of zero, signed arithmetic is used and the result of said adding is truncated to a data size of 32-bits.

6. The apparatus of claim 4, said execution unit to perform the multiply and subtract operation on the first source first complex data element and the second source first complex data element responsive to the instruction by subtracting the product of multiplying the first source first imaginary component by the corresponding second source first imaginary component from the product of multiplying the first source first real component by the corresponding second source first real component.

7. The apparatus of claim 4, said execution unit to perform the multiply and subtract operation on the first source second complex data element and the second source second complex data element responsive to the instruction by also subtracting the product of multiplying the first source second imaginary component by the second source second imaginary component from the product of multiplying the first source second real component by the second source second real component.

8. A data processing system comprising:
an addressable memory to store a plurality of instruction including instructions for SIMD operations;
a processing core including:
an execution core to access a first instruction for a SIMD multiply and subtract operation stored by the addressable memory;
a first source register to store a first plurality of complex data elements and a second source register to store a second plurality of corresponding complex data elements that are the same;
a functional unit to perform the SIMD multiply and subtract operation on the first plurality of complex data elements and the corresponding second plurality of complex data elements to generate a plurality of real components for complex multiplications of the first plurality of complex data elements and the corresponding second plurality of complex data elements;
said execution core to also access a second instruction for a SIMD cross multiply and add operation stored by the addressable memory; and
said functional unit to also perform the SIMD cross multiply and add operation on the first plurality of complex data elements and the corresponding second plurality of complex data elements to generate a plurality of imaginary components for complex multiplications of the first plurality of complex data elements and the corresponding second plurality of complex data elements;
a wireless interface to receive a digital signal comprising a third plurality of complex data elements; and
an I/O system to provide the first plurality of complex data elements to the processor from the third plurality of complex data elements.

9. The data processing system of claim 8 wherein the first instruction for the SIMD multiply and subtract operation, bit positions 23-22 of the first instruction each have a binary value of one and bit position 20 of the first instruction has a binary value of zero.

10. The data processing system of claim 8 wherein the second instruction for a SIMD cross multiply and add operation, bit position 22 of the second instruction has a binary value of zero and bit position 20 of the second instruction has a binary value of one.

11. The data processing system of claim 8 wherein responsive to bit 21 of the first and second instructions having a binary value of one and bit positions 7-5 of the first and second instructions each having a binary value of zero, signed arithmetic is used and the plurality of real components and the plurality of imaginary components for complex multiplications of the first plurality of complex data elements and the corresponding second plurality of complex data elements are truncated to a data size of 32-bits.

* * * * *